United States Patent
Carvell et al.

(10) Patent No.: US 12,311,772 B2
(45) Date of Patent: May 27, 2025

(54) PULSE MODULATED CONTROL WITH FIELD WEAKENING FOR IMPROVED MACHINE EFFICIENCY

(71) Applicant: Tula eTechnology, Inc., San Jose, CA (US)

(72) Inventors: Paul Carvell, San Jose, CA (US); Adya S. Tripathi, San Jose, CA (US)

(73) Assignee: Tula eTechnology, Inc., San Jose, CA (US)

( * ) Notice: Subject to any disclaimer, the term of this patent is extended or adjusted under 35 U.S.C. 154(b) by 147 days.

(21) Appl. No.: 18/184,232

(22) Filed: Mar. 15, 2023

(65) Prior Publication Data

US 2023/0219426 A1  Jul. 13, 2023

Related U.S. Application Data

(63) Continuation-in-part of application No. 17/497,147, filed on Oct. 8, 2021, now Pat. No. 11,623,529, which
(Continued)

(51) Int. Cl.
*H02P 27/08* (2006.01)
*B60L 15/08* (2006.01)
(Continued)

(52) U.S. Cl.
CPC ............ *B60L 15/08* (2013.01); *B60L 15/20* (2013.01); *H02P 23/0027* (2013.01);
(Continued)

(58) Field of Classification Search
CPC ...... H02P 27/08; H02P 23/0027; H02P 23/02; B60L 15/08; B60L 15/20; B60L 2240/421; B60L 2240/423; B60L 2240/527
See application file for complete search history.

(56) References Cited

U.S. PATENT DOCUMENTS 4,441,043 A  4/1984 Decesare
4,989,146 A  1/1991 Imajo
(Continued)

FOREIGN PATENT DOCUMENTS

CN  1829070  9/2006
CN  1829070 A  9/2006
(Continued)

OTHER PUBLICATIONS

Carvell et al., U.S. Appl. No. 18/589,010, filed Feb. 27, 2024.
(Continued)

*Primary Examiner* — Cortez M Cook
(74) *Attorney, Agent, or Firm* — Beyer Law Group LLP

(57) ABSTRACT

Modulated pulse control of electric machines to deliver a desired output in a more energy efficient manner by either (a) operating the electric machine in a continuous mode when a requested torque demand is greater than the peak efficiency torque of the electric machine or (b) in a pulsed modulation mode when the requested torque demand is less than the peak efficiency torque of the electric machine. When operating in the pulsed modulation mode, the inverter may be deactivated to further improve the system efficiency when field weakening is not required to mitigate or eliminate generation of a retarding torque in situations when Back Electromagnetic Force (BEMF) exceeds a supply voltage for the inverter of the machine.

38 Claims, 16 Drawing Sheets

Related U.S. Application Data is a continuation of application No. 17/204,269, filed on Mar. 17, 2021, now Pat. No. 11,167,648, and a continuation-in-part of application No. 16/912,313, filed on Jun. 25, 2020, now Pat. No. 11,228,272, which is a continuation of application No. 16/353,166, filed on Mar. 14, 2019, now Pat. No. 10,742,155.

(60) Provisional application No. 63/161,405, filed on Mar. 15, 2021, provisional application No. 63/013,396, filed on Apr. 21, 2020, provisional application No. 62/810,861, filed on Feb. 26, 2019, provisional application No. 62/658,739, filed on Apr. 17, 2018, provisional application No. 62/644,912, filed on Mar. 19, 2018.

(51) Int. Cl.
*B60L 15/20* (2006.01)
*H02P 23/00* (2016.01)
*H02P 23/02* (2006.01)

(52) U.S. Cl.
CPC ......... *H02P 23/02* (2013.01); *B60L 2240/421* (2013.01); *B60L 2240/423* (2013.01); *B60L 2240/527* (2013.01)

(56) References Cited

U.S. PATENT DOCUMENTS

| | | |
|---|---|---|
| 5,099,410 A | 3/1992 | Divan |
| 5,151,637 A | 9/1992 | Takada et al. |
| 5,325,028 A | 6/1994 | Davis |
| 5,483,141 A | 1/1996 | Uesugi |
| 5,640,073 A | 6/1997 | Ikeda et al. |
| 5,701,062 A | 12/1997 | Barrett |
| 5,731,669 A | 3/1998 | Shimizu et al. |
| 6,121,740 A | 9/2000 | Gale et al. |
| 6,291,960 B1 | 9/2001 | Crombez |
| 6,308,123 B1 | 10/2001 | Ikegaya et al. |
| 6,370,049 B1 | 4/2002 | Heikkila |
| 6,424,799 B1 | 7/2002 | Gilmore |
| 6,483,218 B1 | 11/2002 | Petrinko |
| 6,493,204 B1 | 12/2002 | Glidden et al. |
| 6,605,912 B1 | 8/2003 | Bharadwaj et al. |
| 6,829,515 B2 | 12/2004 | Grimm |
| 6,829,556 B2 | 12/2004 | Kumar |
| 6,906,485 B2 | 6/2005 | Hussein |
| 6,940,239 B2 | 9/2005 | Iwanaga et al. |
| 7,190,143 B2 | 3/2007 | Wei et al. |
| 7,259,664 B1 | 8/2007 | Cho et al. |
| 7,327,545 B2 | 2/2008 | Konishi |
| 7,411,801 B2 | 8/2008 | Welchko et al. |
| 7,453,174 B1 | 11/2008 | Kalsi |
| 7,558,655 B2 | 7/2009 | Garg et al. |
| 7,577,511 B1 | 8/2009 | Tripathi et al. |
| 7,616,466 B2 | 11/2009 | Chakrabarti et al. |
| 7,768,170 B2 | 8/2010 | Tatematsu et al. |
| 7,852,029 B2 | 12/2010 | Kato et al. |
| 7,960,888 B2 | 6/2011 | Ai et al. |
| 7,969,341 B2 | 6/2011 | Robbe et al. |
| 8,099,224 B2 | 1/2012 | Tripathi et al. |
| 8,768,563 B2 | 7/2014 | Nitzberg et al. |
| 8,773,063 B2 | 7/2014 | Nakata |
| 8,841,876 B2 | 9/2014 | Leaver et al. |
| 9,046,559 B2 | 6/2015 | Lindsay et al. |
| 9,050,894 B2 | 6/2015 | Banerjee et al. |
| 9,308,822 B2 | 4/2016 | Matsuda |
| 9,495,814 B2 | 11/2016 | Ramesh |
| 9,512,794 B2 | 12/2016 | Serrano et al. |
| 9,630,614 B1 | 4/2017 | Hill et al. |
| 9,702,420 B2 | 7/2017 | Yoon |
| 9,758,044 B2 | 9/2017 | Gale et al. |
| 9,948,173 B1 | 4/2018 | Abu Qahouq |
| 10,060,368 B2 | 8/2018 | Pirjaberi et al. |
| 10,081,255 B2 | 9/2018 | Yamada et al. |
| 10,256,680 B2 | 4/2019 | Hunstable |
| 10,273,894 B2 | 4/2019 | Tripathi et al. |
| 10,291,168 B2 | 5/2019 | Fukuta |
| 10,291,174 B2 | 5/2019 | Irie et al. |
| 10,320,249 B2 | 6/2019 | Okamoto et al. |
| 10,340,821 B2 | 7/2019 | Magee et al. |
| 10,344,692 B2 | 7/2019 | Nagashima et al. |
| 10,381,968 B2 | 8/2019 | Agirman |
| 10,476,421 B1 | 11/2019 | Khalil et al. |
| 10,550,776 B1 | 2/2020 | Leone et al. |
| 10,742,155 B2 | 8/2020 | Tripathi |
| 10,763,772 B1 | 9/2020 | Fatemi et al. |
| 10,944,352 B2 | 3/2021 | Mazda et al. |
| 11,077,759 B1 | 8/2021 | Srinivasan |
| 11,088,644 B1 | 8/2021 | Carvell |
| 11,133,763 B1 | 9/2021 | Islam |
| 11,133,767 B2 | 9/2021 | Serrano et al. |
| 11,228,272 B2 | 1/2022 | Tripathi |
| 11,345,241 B1 | 5/2022 | Cai |
| 11,427,177 B2 | 8/2022 | Serrano et al. |
| 11,557,996 B1 | 1/2023 | Arvanitis |
| 11,623,529 B2 | 4/2023 | Carvell et al. |
| 11,626,827 B2 | 4/2023 | Tripathi |
| 11,628,730 B2 | 4/2023 | Srinivasan |
| 11,637,513 B2 | 4/2023 | Phillips et al. |
| 11,673,476 B2 | 6/2023 | Cai |
| 11,695,361 B2 | 7/2023 | Carvell et al. |
| 12,003,202 B2 | 6/2024 | Tripathi |
| 12,206,346 B2 | 1/2025 | Carvell et al. |
| 2001/0039926 A1 | 11/2001 | Kobayashi et al. |
| 2002/0043954 A1 | 4/2002 | Hallidy et al. |
| 2005/0127861 A1 | 6/2005 | McMillan et al. |
| 2005/0151437 A1 | 7/2005 | Ramu |
| 2005/0160771 A1 | 7/2005 | Hosoito et al. |
| 2007/0216345 A1 | 9/2007 | Kanamori |
| 2007/0287594 A1 | 12/2007 | DeGeorge et al. |
| 2008/0129243 A1 | 6/2008 | Nashiki |
| 2008/0179980 A1 | 7/2008 | Dawsey et al. |
| 2009/0045691 A1 | 2/2009 | Ichiyama |
| 2009/0058592 A1 | 3/2009 | Leghissa et al. |
| 2009/0121669 A1 | 5/2009 | Hanada |
| 2009/0128072 A1 | 5/2009 | Strong et al. |
| 2009/0146615 A1 | 6/2009 | Zillmer et al. |
| 2009/0179608 A1 | 7/2009 | Welchko et al. |
| 2009/0306841 A1 | 12/2009 | Miwa et al. |
| 2010/0010724 A1 | 1/2010 | Tripathi et al. |
| 2010/0066299 A1 | 3/2010 | Izumi et al. |
| 2010/0201294 A1 | 8/2010 | Yuuki et al. |
| 2010/0296671 A1 | 11/2010 | Khoury et al. |
| 2011/0029179 A1 | 2/2011 | Miyazaki et al. |
| 2011/0031922 A1* | 2/2011 | Sakai ............... H02P 27/08 318/519 |
| 2011/0089774 A1 | 4/2011 | Kramer |
| 2011/0101812 A1 | 5/2011 | Finkle et al. |
| 2011/0130916 A1 | 6/2011 | Mayer |
| 2011/0208405 A1 | 8/2011 | Tripathi et al. |
| 2012/0056569 A1 | 3/2012 | Takamatsu et al. |
| 2012/0112674 A1 | 5/2012 | Schulz et al. |
| 2012/0169263 A1 | 7/2012 | Gallegos-Lopez et al. |
| 2012/0217916 A1 | 8/2012 | Wu et al. |
| 2012/0217921 A1 | 8/2012 | Wu et al. |
| 2013/0002173 A1 | 1/2013 | Baglino et al. |
| 2013/0062138 A1 | 3/2013 | Naitou et al. |
| 2013/0119814 A1 | 5/2013 | Burch et al. |
| 2013/0134912 A1 | 5/2013 | Khalil et al. |
| 2013/0141027 A1 | 6/2013 | Nakata |
| 2013/0226420 A1 | 8/2013 | Pedlar et al. |
| 2013/0241445 A1 | 9/2013 | Tang |
| 2013/0258734 A1 | 10/2013 | Nakano et al. |
| 2013/0314021 A1 | 11/2013 | Yamada et al. |
| 2014/0018988 A1 | 1/2014 | Kitano et al. |
| 2014/0028225 A1 | 1/2014 | Takamatsu et al. |
| 2014/0130506 A1 | 5/2014 | Gale et al. |
| 2014/0176034 A1 | 6/2014 | Matsumura et al. |
| 2014/0217940 A1 | 8/2014 | Kawamura |
| 2014/0265957 A1 | 9/2014 | Hu et al. |
| 2014/0292382 A1 | 10/2014 | Ogawa et al. |
| 2014/0354199 A1 | 12/2014 | Zeng et al. |

(56) References Cited

U.S. PATENT DOCUMENTS

| | | |
|---|---|---|
| 2015/0025725 A1 | 1/2015 | Uchida |
| 2015/0236628 A1 | 8/2015 | Wang et al. |
| 2015/0240404 A1 | 8/2015 | Kim et al. |
| 2015/0246685 A1 | 9/2015 | Dixon et al. |
| 2015/0261422 A1 | 9/2015 | Den et al. |
| 2015/0297824 A1 | 10/2015 | Cabiri et al. |
| 2015/0318803 A1 | 11/2015 | Wu et al. |
| 2016/0114830 A1 | 4/2016 | Dixon et al. |
| 2016/0226409 A1 | 8/2016 | Ogawa |
| 2016/0233812 A1 | 8/2016 | Lee et al. |
| 2016/0269225 A1 | 9/2016 | Kirchmeier et al. |
| 2016/0373047 A1 | 12/2016 | Loken et al. |
| 2017/0087990 A1 | 3/2017 | Neti et al. |
| 2017/0163108 A1 | 6/2017 | Schencke et al. |
| 2017/0331402 A1 | 11/2017 | Smith et al. |
| 2018/0032047 A1 | 2/2018 | Nishizono et al. |
| 2018/0045771 A1 | 2/2018 | Kim et al. |
| 2018/0154786 A1 | 6/2018 | Wang et al. |
| 2018/0276913 A1 | 9/2018 | Garcia et al. |
| 2018/0323665 A1 | 11/2018 | Chen et al. |
| 2018/0334038 A1 | 11/2018 | Zhao et al. |
| 2019/0058374 A1 | 2/2019 | Enomoto et al. |
| 2019/0267919 A1 | 8/2019 | Suzuki et al. |
| 2019/0288629 A1 | 9/2019 | Tripathi |
| 2019/0288631 A1 | 9/2019 | Tripathi |
| 2019/0341820 A1 | 11/2019 | Krizan et al. |
| 2020/0212834 A1 | 7/2020 | Mazda et al. |
| 2020/0262398 A1 | 8/2020 | Sato et al. |
| 2020/0328714 A1 | 10/2020 | Tripathi |
| 2020/0343849 A1 | 10/2020 | Coroban-Schramel |
| 2020/0366223 A1 | 11/2020 | Coroban-Schramel |
| 2021/0146909 A1 | 5/2021 | Serrano et al. |
| 2021/0203263 A1 | 7/2021 | Serrano et al. |
| 2021/0323415 A1 | 10/2021 | Carvell et al. |
| 2021/0351733 A1 | 11/2021 | Carvell |
| 2022/0416707 A1 | 12/2022 | Chen |
| 2023/0114289 A1 | 4/2023 | Islam et al. |
| 2023/0223885 A1 | 7/2023 | Tripathi |
| 2023/0253911 A1 | 8/2023 | Islam |
| 2023/0283211 A1 | 9/2023 | Carvell |
| 2023/0308040 A1 | 9/2023 | Farah et al. |
| 2024/0022191 A1 | 1/2024 | Phillips et al. |
| 2024/0136968 A1 | 4/2024 | Mazda |
| 2024/0291410 A1 | 8/2024 | Carvell et al. |
| 2024/0291416 A1 | 8/2024 | Tripathi |
| 2024/0372489 A1 | 11/2024 | Srinivasan |

FOREIGN PATENT DOCUMENTS

| | | |
|---|---|---|
| CN | 102381265 A | 3/2012 |
| CN | 104716754 A | 6/2015 |
| CN | 204589885 U | 8/2015 |
| CN | 105196877 A | 12/2015 |
| CN | 205229379 U | 5/2016 |
| CN | 106932208 A | 7/2017 |
| CN | 107067780 A | 8/2017 |
| CN | 207129052 U | 3/2018 |
| CN | 108216026 A | 6/2018 |
| CN | 108445386 A | 8/2018 |
| CN | 110212725 | 9/2019 |
| DE | 102014206342 | 10/2015 |
| EP | 2605398 A1 | 6/2013 |
| FR | 2989479 | 10/2013 |
| GB | 2273212 | 8/1994 |
| JP | H05153705 | 6/1993 |
| JP | 10243680 | 9/1998 |
| JP | 2008-079686 A | 4/2008 |
| JP | 2009-065758 A | 3/2009 |
| JP | 2010119216 | 5/2010 |
| JP | 2011-67043 | 3/2011 |
| JP | 5165660 B2 | 12/2012 |
| JP | 2014-033449 A | 2/2014 |
| JP | 5857472 B2 | 12/2015 |
| JP | 2017-011970 A | 1/2017 |
| JP | 2017-200382 | 11/2017 |
| JP | 2018-033250 A | 3/2018 |
| JP | 2020048254 A | 3/2020 |
| JP | 2022/020123 | 2/2022 |
| KR | 10-2013-0095773 | 8/2013 |
| KR | 10-2017-0021146 A | 2/2017 |
| KR | 10-2017-0032976 A | 3/2017 |
| WO | WO03/36787 A1 | 5/2003 |
| WO | WO2012-010993 A2 | 1/2012 |

OTHER PUBLICATIONS

Carvell, U.S. Appl. No. 18/630,634, filed Apr. 9, 2024.
Carvell et al., U.S. Appl. No. 17/204,269, filed Mar. 17, 2021.
Cai et al., "Torque Ripple Reduction for Switched Reluctance Motor with Optimized PWM Control Strategy", https://www.mdpi.com/1996-1073/11/11/3215, Oct. 15, 2018, 27 pages.
Spong et al., "Feedback Linearizing Control of Switched Reluctance Motors", IEEE Transactions on Automatic Control, vol. AC-32, No. 5, May 1987, pp. 371-379.
International Search Report and Written Opinion dated Jul. 9, 2021 from International Application No. PCT/US2021/022756.
Mirzaeva et al., "The use of Feedback Quantizer PWM for Shaping Inverter Noise Spectrum", Power Electronics and Motion Control Conference (EPE/PEMC), 2012 15$^{th}$ International IEEE, Sep. 4, 2012, p[ages DS3c.10-1, XP032311951, DOI: 10.1109/EPEPEMC.2012.6397346, ISBN: 978-1-4673-1970.6.
Luckjiff et al., "Hexagonal ΣΔ Modulators in Power Electronics", IEEE Transactions on Power Electronics, Institute of Electrical and Electronics Engineers, USA, vol. 20, No. 5, Sep. 1, 2005, pp. 1075-1083, XP011138680, ISSN: 0885-8993, DOI: 10.1109/TPEL.2005.854029.
Ramsey, "How This Father and Son's New Electric Turbine Could Revolutionize Electric Cars; Hunstable Electric Turbine can Produce up to Three Times the Torque of Any Other Motor", https://www.parsintl.com/publication/autoblog/, Mar. 8, 2020.
Srinivasan, U.S. Appl. No. 17/158,230, filed Jan. 26, 2021.
Phillips, U.S. Appl. No. 18/305,776, filed Apr. 24, 2023.
Phillips, U.S. Appl. No. 18/348,255, filed Jul. 6, 2023.
Carvell et al., U.S. Appl. No. 18/362,602, filed Jul. 31, 2023.
Parsels et al., U.S. Appl. No. 18/452,363, filed Aug. 18, 2023.
Islam et al., U.S. Appl. No. 18/452,050, filed Aug. 18, 2023.
Islam et al., U.S. Appl. No. 18/452,260, filed Aug. 18, 2023.

\* cited by examiner

PULSE MODULATED CONTROL WITH FIELD WEAKENING FOR IMPROVED MACHINE EFFICIENCY

CROSS-REFERENCE TO RELATED APPLICATIONS

This application is a Continuation-in-Part of U.S. application Ser. No. 17/497,147 filed Oct. 8, 2021 (P205C1), which is a Continuation of U.S. application Ser. No. 17/204,269, filed Mar. 17, 2021 (P205) (now U.S. Pat. No. 11,167,648, issued Nov. 9, 2021), which claims priority to U.S. Provisional Application Ser. No. 63/013,396, filed Apr. 21, 2020 (P205P), and 63/161,405, filed Mar. 15, 2021 (P210P). U.S. application Ser. No. 17/497,147 is also a Continuation-in-Part of U.S. application Ser. No. 16/912,313, filed on Jun. 25, 2020 (200C) (now U.S. Pat. No. 11,228,272, issued Jan. 18, 2022), which is a Continuation of U.S. application Ser. No. 16/353,166, filed on Mar. 14, 2019 (P200B) (now U.S. Pat. No. 10,742,155, issued on Aug. 11, 2020), which claims priority of U.S. Provisional Patent Application Nos.: 62/644,912, filed on Mar. 19, 2018 (P200P); 62/658,739, filed on Apr. 17, 2018 (P200P2); and 62/810,861 filed on Feb. 26, 2019 (P200P3), all of which are incorporated herein by reference in their entirety.

BACKGROUND OF THE INVENTION

The present application relates generally to modulated pulse control of electric machines to selectively deliver a desired output in a more energy efficient manner, and more particularly, to pulse modulation control that uses field weakening to mitigate or eliminate generation of a retarding motor torque in situations when Back Electromagnetic Force (BEMF) exceeds a supply voltage for motor inverter.

The term "electric machine" as used herein is intended to be broadly construed to mean both electric motors and generators. Electric motors and generators are structurally very similar. Both include a stator having a number of poles and a rotor. When an electric machine is operating as a motor, it converts electrical energy into mechanical energy. When operating as a generator, the electric machine converts mechanical energy into electrical energy.

Modern electric machines have relatively high energy conversion efficiencies. The energy conversion efficiency of most electric machines, however, can vary considerably based on their operational load. With many applications, an electric machine is required to operate under a wide variety of different operating load conditions. As a result, machines typically operate at or near the highest levels of efficiency at certain times, while at other times, they operate at lower efficiency levels.

Battery powered electric vehicles provide a good example of an electric machine operating at a wide range of efficiency levels. During a typical drive cycle, an electrical vehicle will accelerate, cruise, de-accelerate, brake, corner, etc. Within certain rotor speed and/or torque ranges, the electric machine operates at or near is most efficient operating point, i.e., its "sweet spot". Outside these ranges, the operation of electric machine is less efficient. As driving conditions change, the electric machine transitions between high and low operating efficiency levels as the rotor speed and/or torque changes. If the electric machine could be made to operate a greater proportion of a drive cycle in high efficiency operating regions, the range of the vehicle for a given battery charge level would be increased. Since the limited range of battery powered electric vehicles is a major commercial impediment to their use, extending the operating range of the vehicle is highly advantageous.

Although the energy conversion efficiency of conventional electric machines is generally good, there are continuing efforts to further improve energy conversion efficiencies over broader ranges of operating conditions.

SUMMARY OF THE INVENTION

The present application relates to modulated pulse control of electric machines to selectively deliver a desired output in a more energy efficient manner.

In a non-exclusive embodiment, the electric machine is operated either (a) in a continuous mode when a requested torque demand is greater than a designated pulsing threshold or (b) in a pulse modulation mode when the requested torque demand is less than the pulsing threshold. When operating in pulse modulation mode, a duty cycle is defined and the inverter of the machine is pulsed. By properly selecting the duty cycle and magnitude of the pulses, the average shaft torque of the machine during the pulsing equals the shaft torque output of the machine if continuously operated. But since the motor is operated at or near its peak efficiency torque during the pulses, the overall efficiency of the machine is improved compared to continuous operation below the peak efficiency torque. In some embodiments the pulsing threshold varies as a function of the electric machine's shaft speed. In some embodiments, the pulsing threshold for any particular machine speed is at or close to the peak efficiency torque for that machine speed.

During pulses, the inverter is enabled and the motor generates torque at or near its peak efficiency levels. In the periods between pulses, the inverter is ideally disabled so the electric machine generates no torque. However, if a need for field weakening is present, which generally occurs when Back Electromagnetic Force (BEMF) of the motor exceeds the power supply of the inverter, then the inverter remains active, but no torque is demanded (i.e., zero torque). This allows to inverter to continue to apply field weakening during the zero torque periods between pulses. When the electric motor is operating as a motor, the field weakening mitigates or eliminates any retarding torque that would otherwise be generated by the motor during pulsing.

In various embodiments, the electric machine is any type of electric machine capable of reducing BEMF by applying field weakening. Representative electric machines include, but are not limited to, Electrically Excited Synchronous Machines (EESMs), sometimes alternatively referred to as Wound Rotor Synchronous machines (WRSMs), or Wound Field Synchronous Machine (WFSM), internal permanent magnets, surface permanent magnets, induction, synchronous reluctance, permanent assisted synchronous reluctance, separately excited induction, flux switching, switch reluctance, and other types of machines.

In yet another non-exclusive embodiment, field weakening can be employed with any of the aforementioned electric machines in a battery powered electric vehicle. In such applications, the decision to operate in either the continuous mode or the pulse modulation mode can be based on (a) if the requested torque demand place on a given electric machine is below a pulsing threshold, (b) Noise, Vibration and Harshness (NVH) considerations, or a combination of (a) and (b). For instance if pulsed operation results in excessive NVH, then the electric machine may be operated in the continuous mode even if the requested torque demand is less than the threshold. On the other hand, if operating conditions are such that more NVH can be tolerated, such as the vehicle is traveling over a bumpy, uneven, road surface, then it may be advantageous to operate the electric machine in the pulsed mode since the excessive NVH caused by pulsed operation of the electric machine will be "masked" by the unavoidable NVH caused by the road surface.

The describe approach can be used to improve the energy conversion efficiency of both motors and generators in a wide variety of applications, including but not limited to electric vehicles.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

Pulsed electric machine control is described in U.S. patent application Ser. No. 16/818,570 filed Mar. 13, 2020, U.S. patent application Ser. No. 16/353,159 filed on Mar. 14, 2019, and U.S. Provisional Patent Application Nos.: 62/644,912, filed on Mar. 19, 2018; 62/658,739, filed on Apr. 17, 2018; and 62/810,861 filed on Feb. 26, 2019. Each of the foregoing applications is incorporated herein by reference in their entirety.

The present application relates further improvements to pulsed control of a wide variety of electric machines (e.g., electric motors and generators) that would otherwise be operated in a continuous manner. For the sake of simplicity, the discussion below is largely described within the context of an electric machine operating as a motor. However, it should be appreciated that the concepts described in the context of motors are generally equally applicable to electric machines operating as generators.

Vehicle Motor Efficiency Map

Figure 1:
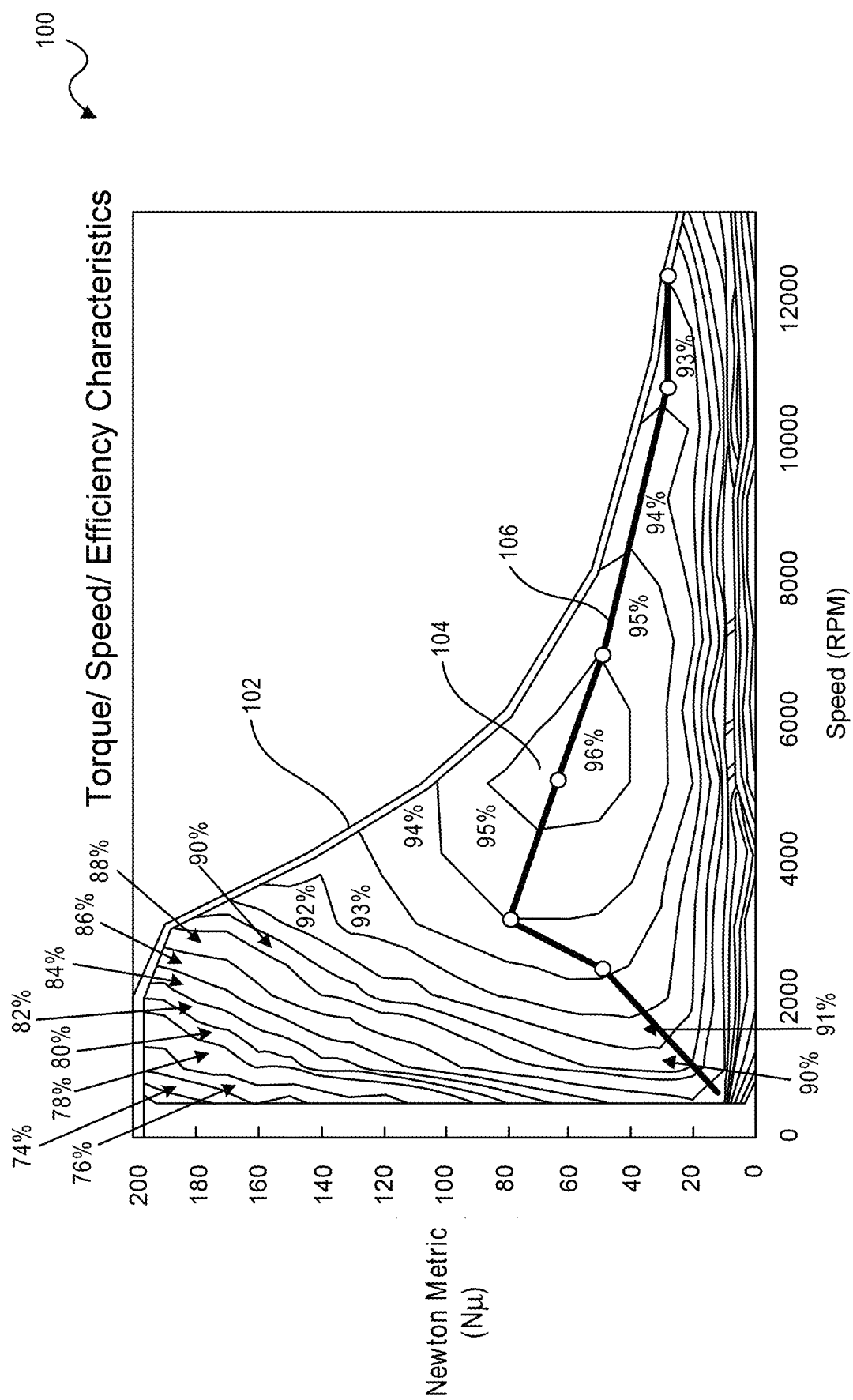
FIG. 1 is a representative Torque/Speed/Efficiency graph illustrating the energy conversion efficiency of a representative electric machine while operating as an electric motor under different operating conditions.

Referring to FIG. 1, an exemplary vehicle electric machine efficiency map 100 while operating as a motor under different load and speed conditions is illustrated. The map 10 plots torque (N*m) along the vertical axis as a function of electric machine speed (RPM) along the horizontal axis. The maximum steady-state output power is given by curve 102.

The area under the peak-torque/speed curve 102 is mapped into a plurality of regions, each labeled by an operational efficiency percentage. For the particular electric machine shown, the following characteristics are evident:

The most efficient or "sweet-spot" region of its operating range is the operating region labeled 104, which is generally in the range of 4,500-6,000 RPM with a torque output in the range of about 40-70 N*m. In region 104, the energy conversion efficiency is on the order of 96%, making it the "sweet spot", where the motor is operating in its most efficient operating range.

As the motor speed increases beyond approximately 6,000+RPM, the efficiency tends to decrease, regardless of the output torque.

As the output torque increases beyond 70 N*m or falls below 40 N*m, the efficiency percentage tends to decrease from its peak, in some situations rather significantly. For example, when the motor is operating at approximately 2,000 RPM and an output torque of 100 N*m, the efficiency is approximately 86%. When torque output falls below about 30 N*m, regardless of the motor speed, the efficiency drops, approaching zero at zero load.

At any particular electric machine speed, there will be a corresponding most efficient output torque, which is diagrammatically illustrated by a maximum efficiency curve 106.

While the most efficient output torque for a given electric machine may be a primary factor in determining if continuous or pulsed operation is desired, other factors may also be considered, such as NVH. For example if there is excessive NVH, the electric machine may be operated in the continuous mode even if the current speed and torque demand otherwise dictates pulse operation. On the other hand, the electric machine may be operated in the pulsed mode even when NVH caused by pulsed operation is excessive because, other external factors, such as a non-smooth road surface, will mask out any extra NVH caused by pulsed operation.

The map 100 as illustrated was derived from an electric motor used in a 2010 Toyota Prius. Map 100 is for an internal permanent magnet synchronous electric machine. It should be understood that this map 100 is merely illustrative and should not be construed as limiting in any regard. A similar map can be generated for just about any electric machine, regardless of whether it is used in a vehicle or in some other application.

As can be seen from the map 100, when motoring, the electric machine is generally most efficient when operating within the speed and torque ranges of the sweet spot 104. If the operating conditions can be controlled so that the motor operates a greater proportion of the time at or near its sweet spot 104, the overall energy conversion efficiency of the motor can be significantly improved.

From a practical point of view, however, many driving situations dictate that the motor operate outside of the speed and torque ranges of the sweet spot 104. In electric vehicles it is common to have no transmission or gear box and as such have a fixed ratio of the electric motor rotation rate to the wheel rotation rate. In this case, the motor speed may vary between zero, when the vehicle is stopped, to a relatively high RPM when cruising at highway speeds. The torque requirements may also vary widely based on factors such as whether the vehicle is accelerating or decelerating, going uphill, going downhill, traveling on a level surface, braking, etc.

As also seen in FIG. 1, at any particular speed, there will be a corresponding most efficient output torque which is diagrammatically illustrated by maximum efficiency curve 106. From a conceptual standpoint, when the desired motor torque is below the most efficient output torque for the current motor speed, the overall efficiency of the motor can be improved by pulsing the motor, so as to operate the motor a proportion of time at or near its peak efficiency for the given speed and the remainder of the time at a low or zero torque output level. The average torque thus generated is controlled by controlling the duty cycle of peak efficiency torque applied to the electric machine.

It should be appreciated that the electric machine would have a similar efficiency map that characterizes its efficiency when acting as a generator.

Pulsed Operation

Figure 3:
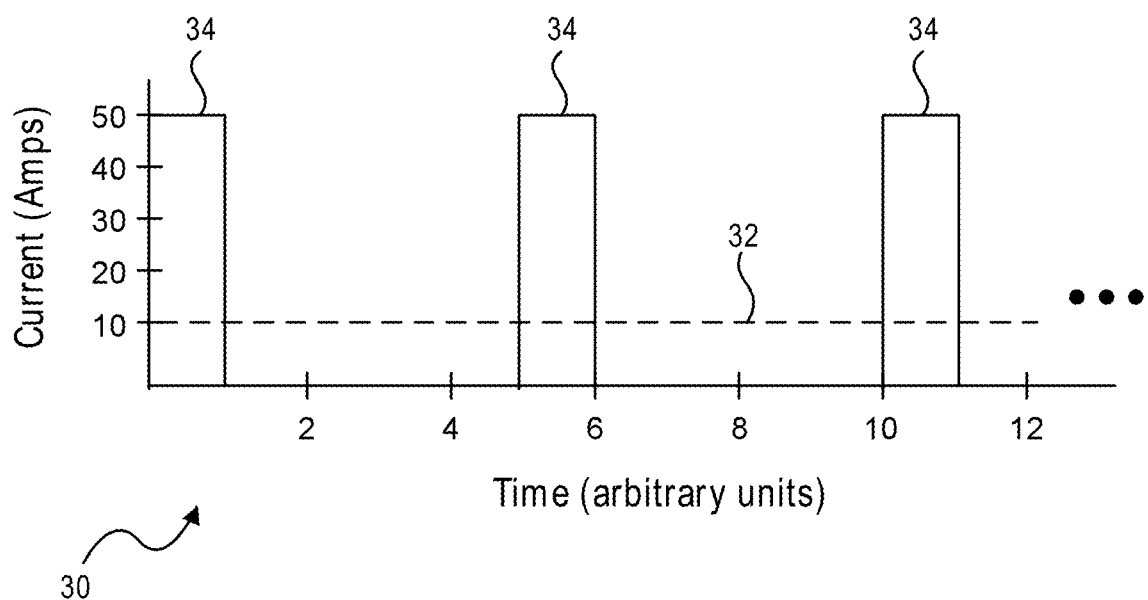
FIG. 3 is a graph illustrating a pulsed current signal applied to an electric machine in response to a torque demand while operating as a motor.

FIG. 3 is a graph 30 that diagrammatically illustrates an example of pulsed motor operation. In this particular example, the desired motor torque is 10 Nm, but the most efficient torque output for the current operating motor speed is 50 Nm. Conceptually, the motor can be driven to deliver a net torque of 10 Nm by causing the motor to deliver 50 Nm of torque for 20% of the time and then delivering no (zero) torque the remaining 80% of the time. Since the motor operates more efficiently when it is delivering 50 Nm than when it delivers 10 Nm, the motor's overall efficiency can be improved by pulsing the motor's operation in the described manner. In the example illustrated in FIG. 3 the motor produces a motor output of 50 Nm (labeled 34) for a period of 1 time unit out of every 5 time units and then the motor is controlled to produce zero torque during the intervening 4 time units.

In FIG. 3, the graph 30 plots on the vertical axis a total applied current to an electric machine 12 (acting as an electric motor) versus time on the horizontal axis. For illustrative purposes, it will be assumed that each ampere of applied current will produce 1 N*m of output torque. In this particular example, a desired motor output torque is 10 N*m, which will require 10 amps of current as represented by the dashed line 32. Also in this example, the most efficient torque output for the motor is 50 N*m corresponding to 50 amps of applied current.

During conventional operation, the motor would continuously generate 10 N*m, provided the desired torque remained at this value. With pulsed-control operation, the motor is pulsed, as represented by pulses 34, to deliver 50 N*m of torque for 20% of the time. The remaining 80% of the time, the motor in this example is off. The net output of the motor therefore meets the operational demand of 10 N*m. Since the motor operates more efficiently when it is delivering 50 N*m than when it delivers 10 N*m, the motor's overall efficiency is thus improved by pulsing the motor using a 20% duty cycle while still meeting the average torque demand.

In the above example, the duty cycle is not necessarily limited to 20%. As long as the desired motor output, does not exceed 50 N*m, the desired motor output can be met by a wide range of different duty cycles. For instance, if the desired motor output changes to 20 N*m, the duty cycle of the motor operating at 50 N*m can be increased to 40%; if the desired motor output changes to 40 N*m, the duty cycle can be increase to 80%; if the desired motor output changes to 5 N*m, the duty cycle can be reduced to 10% and so on. Generally, pulsed motor control can potentially be used advantageously any time that the desired motor torque falls below its maximum efficiency curve (i.e., the curve 106 of FIG. 1).

On the other hand, when the desired motor torque is at or above the maximum efficiency curve, the motor may be operated in a conventional (continuous or non-pulsed) manner to deliver the desired torque. Pulsed operation thus offers opportunity for efficiency gains when the motor is required to deliver an average torque below the peak efficiency torque for a given motor speed.

Figure 2:
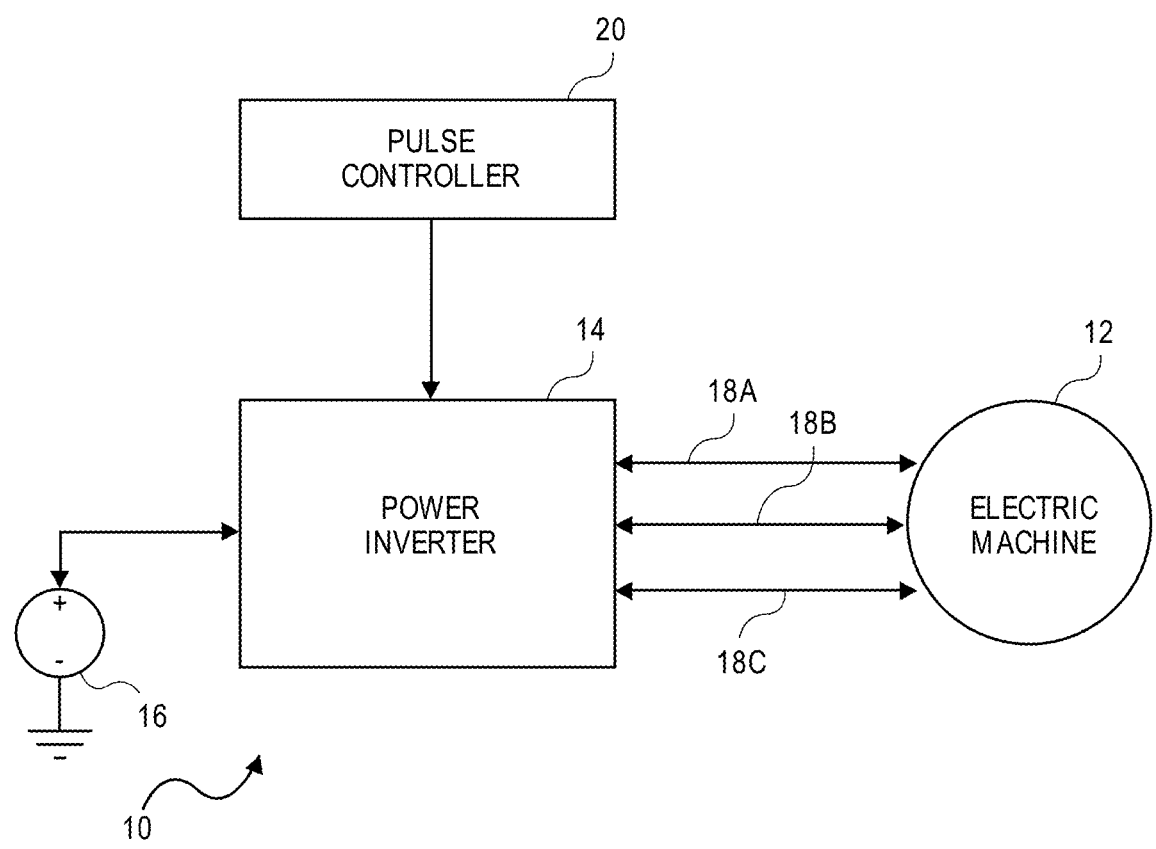
FIG. 2 illustrates a pulsed controlled electric machine in accordance with a non-exclusive embodiment of the present invention.

It should be noted that current and torque values and time scale provided herein are merely illustrative and are not intended to be limiting in any manner. In actual motor pulsing embodiments, the pulse duration used may widely vary based on the design needs of any particular system and other factors, such as the slew rate during transitions, NVH considerations, etc. In generally, however, the scale of the periods for each pulse cycle can widely vary on the order of 10 μsec to 10.0 seconds. In non-exclusive embodiments, the pulses for example may range from between 0.2 and 100 milliseconds (10 to 5000 Hz). Furthermore, there are a wide variety of different motors, and each motor has its own unique efficiency characteristics. Further, at different motor speeds, a given motor will have a different maximum efficiency curve. The nature of the curve may vary depending on the particular motor or a particular application. For example, the current pulses need not be flat topped as depicted in FIG. 2 and/or the current need not go to zero during periods between pulses but may be some non-zero value. Regardless of the particular curve used, however, at some proportion of the time the motor is operating is preferably at or near its highest efficiency region for a given motor speed, and optionally, for other considerations, such as slew, NVH, etc.

Power Inverter

Referring to FIG. 2, a diagram of a power controller 10 for pulsed operation of a three phase electric machine 12 is illustrated. As noted above, the electric machine 12 is any type of electric machine with field weakening capabilities, such as any type of electric machine with a permanent magnet rotor design, including for example permanent magnet assisted synchronous reluctance machines and IPM machines. Also as described in more detail below, EESMs may also be candidates for pulsed operation because such electric machines may also operate with field weakening when operating at or near peak efficiency.

The power controller 10 includes a power inverter 14, a DC power supply 16, and a pulse controller 20. The power inverter 14 may be operated as a power inverter or power rectifier depending on the direction of energy flow through the system.

When the electric machine 12 is operated as a motor, the power inverter 14 is responsible for generating three-phased AC power (denoted as 18A, 18B and 18C for phases A, B and C respectively) from the DC power supply 16. The three-phased input power is applied to the windings of the stator of the electric machine 12 for generating a Rotating Magnetic Force (RMF). For most common permanent magnetic motors, the rotor field is that of the permanent magnet. In an induction motor this rotation field induces current to flow in the rotor winding which in turn induces a rotor magnetic field. With EESM, the rotor field is separately excited. The interaction of the rotor and stator magnetic fields generates an electromagnetic force (EMF) causing rotation of the rotor, which in turn rotates a motor shaft. The rotating shaft provides the output torque of the motor.

The three phases, 18A-18C are each depicted by lines with arrows on both ends indicating that current can flow in either direction. When used as a motor, current flows from the power supply 16, through the power inverter 14, to the electric machine 12. When used as a generator, the current flows from the electric machine 12, through the power inverter 14, to the power supply 16. When operating as a generator, the power inverter 14 essentially operates as a power rectifier and the AC power coming from the electric machine 12 is converted to DC power being stored in the DC power supply, such as a battery or capacitor.

The pulse controller 20 is responsible for selectively pulsing the three-phased input current 18A-18C to the electric machine 12. During conventional (i.e., continuous) operation, the three-phased input current provided to the electric machine 12 are continuous sinusoidal current signals, each 120° degrees out of phase with respect to one another. During pulsed operation, the phased three sinusoidal current signals 18A-18C are selectively pulsed using any of the approaches described herein.

Figure 4A:
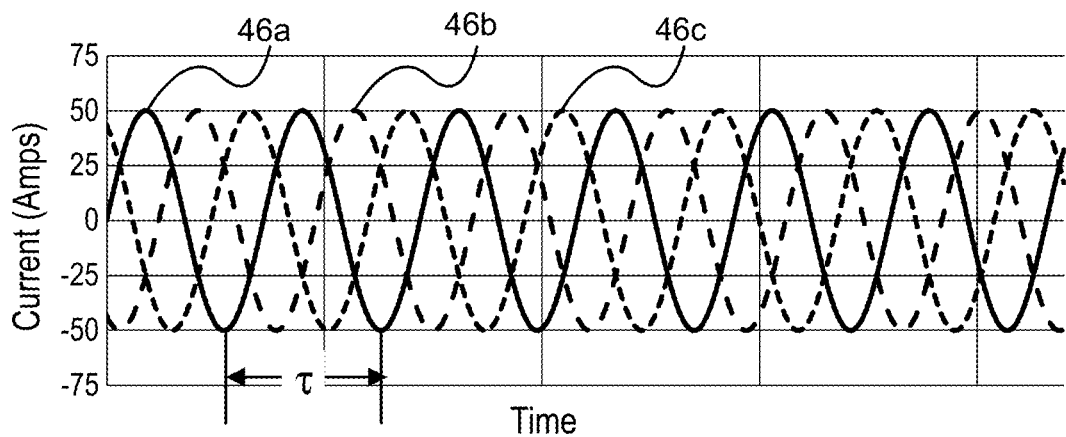
FIG. 4A is a diagrammatic representation of a continuous three-phase AC waveform provided to an electric machine.
Figure 4B:
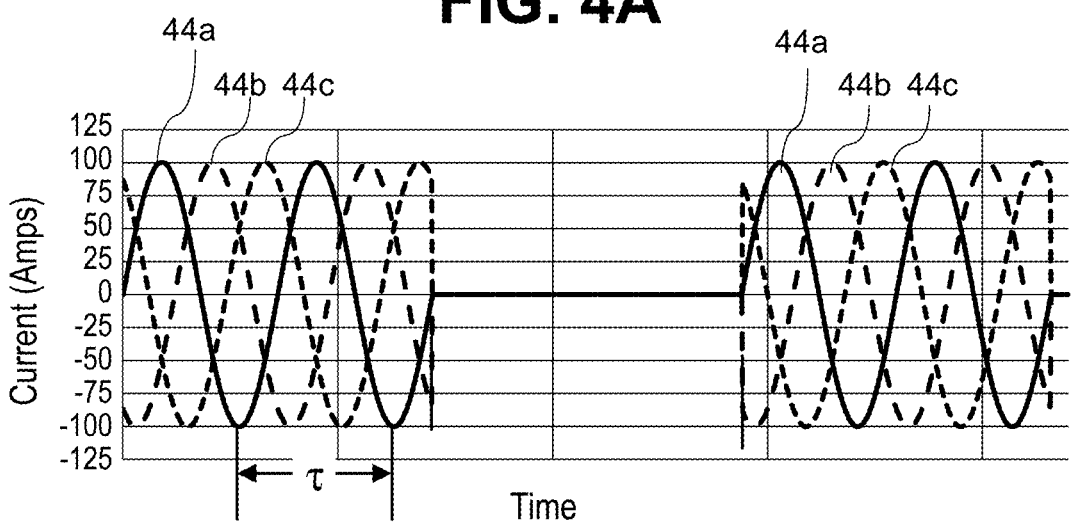
FIGS. 4B and 4C are different examples of pulsed three-phase AC waveform having a similar duty cycle that provide the same torque as the continuous waveform of FIG. 4A.
Figure 4C:
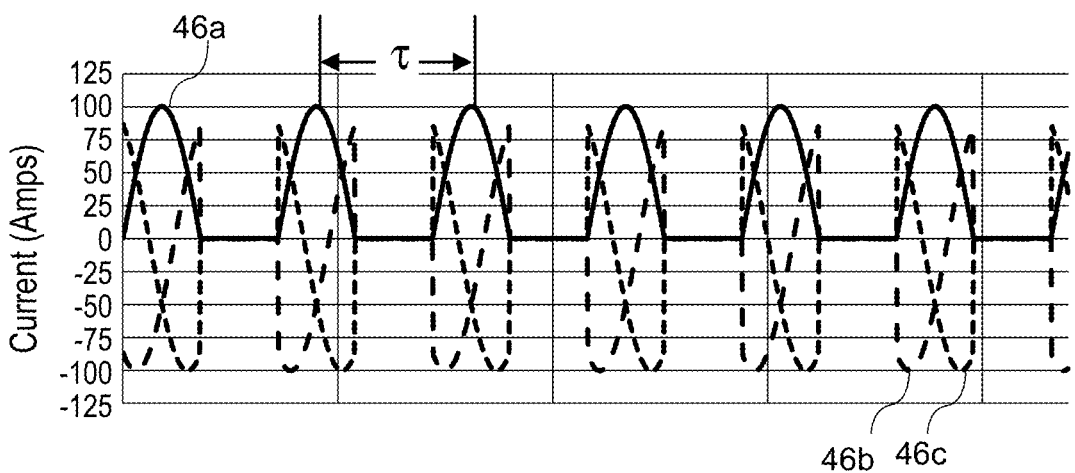

Referring to FIG. 4A-4C, plots are provided for illustrating the difference between continuous and pulsed three-phased current provided to/by the electric machine 12. In each, current is plotted on the vertical axis and time is plotted along the horizontal axis.

FIG. 4A illustrates conventional sinusoidal three-phased current 42a, 42b, and 42c delivered to/produced by the electric machine 12 during excitation. Phase B, denoted by curve 42b lags phase A, denoted by 42a by 120 degrees. Phase C, denoted by curve 42c, lags phase B by 120 degrees. The sine wave period is $\tau$. The three-phased current 42a, 42b, and 42c is continuous (not pulsed) and has a designated maximum amplitude of approximately 50 amps. It should be appreciated that 50 amps is only a representative maximum current, and the maximum current may have any value.

FIG. 4B and FIG. 4C illustrate two examples of different pulsed three-phased sinusoidal current waveforms 44a, 44b, and 44c and 46a, 46b, and 46c respectively. Note, each set of waveforms have a fifty percent (50%) duty cycle and peak amplitude of approximately 100 amps.

In FIG. 4A the period of the sinusoidal waveforms 44a, 44b, and 44c is $\tau$, however, the sine waveforms are each modulated on and off. The difference between pulsed currents 44a-c and 46a-c of FIG. 4C is the duration of their respective current pulses and the interleaved "off" periods. In FIG. 4B, the current pulses 44a-c is interleaved with "off" periods of equal length. The length of each on and off period is $2\tau$. In FIG. 4C, the current pulses 46a-c and the interleaved "off" periods again have equal duration. In this case the duration is $\tau/2$. In both examples, the duty cycle is 50%. However, the duration of the "on" and "off" time durations periods is different, i.e., the frequency of the pulsed modulation is different. The frequency of the pulsed modulation may vary based on the type of electrical machine used, noise and vibration considerations, current operating rotor speed, and other factors.

When operating as a motor, the excitation current in FIG. 4B and FIG. 4C delivers the same average torque as the continuously applied three-phased current of FIG. 4A (assuming torque is proportional to current, which is often the case with surface permanent magnet type electric machines).

FIG. 4B and FIG. 4C illustrate applications in which the "on" drive pulses are evenly spaced while the electric machine is operated at a steady state desired output level. Such an approach works well in many circumstances but is not a requirement. The duty cycle need not be 50% but can be adjusted to match the desired average torque. In FIG. 4B and FIG. 4C the phase of the pulses is synchronized with the applied AC power; however, the phase of the pulses need not be synchronized with the phase of the applied AC power in some embodiments. Thus, the relative sizes and/or timing of the electric machine drive pulses can be varied as long as they average out to the desired average torque.

It is noted that the pulsed three-phased sinusoidal current waveforms 44a, 44b, and 44c and 46a, 46b, and 46c of FIG. 4B and FIG. 4C as illustrated show essentially instantaneous transition times when transitioning from the on state to the off state, or vice versa. It should be understood, however, that in real-world embodiments, such transition times are typically not instantaneous, but instead are dependent on such factors the ability of the inverter to overcome the reaction of the motors inductance to a change in applied voltage and 2) the moderation of the torque disturbance caused by these transitions such that they do not produce unacceptable NVH Electric Machine Efficiency and Maps The efficiency of an electric machine operating in a system can be improved by modulating operation to occur in more efficient regions and minimizing operation in inefficient regions while still meeting requested torque demands. Accordingly, to improve the efficiency of a given system, its peak efficiency and less efficient operating regions need to be identified.

Figure 5:
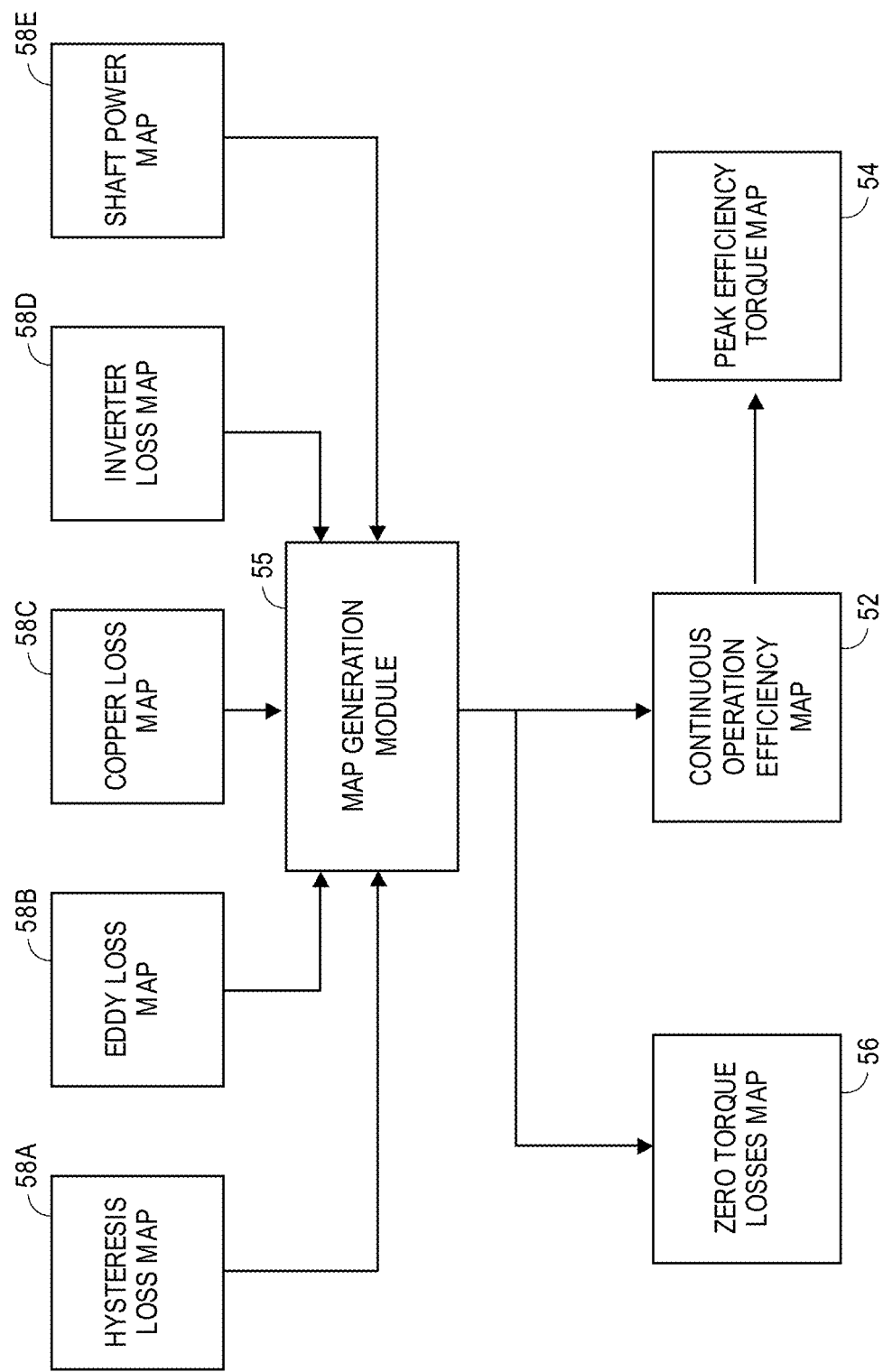
FIG. 5 is a diagram illustrating generation of a modulation efficiency map, a peak efficiency torque map and a zero torque losses map for an exemplary electric machine.

Referring to FIG. 5, a diagram 50 illustrating how a continuous operation efficiency map 52, a peak efficiency torque map 54 and a zero torque losses map 56 for an exemplary system are generated is shown. As depicted in the figure, the maps 52, 54 and 56 for the system being considered are derived from generating a hysteresis loss map 58A, an eddy loss map 58B, a copper loss map 58C, an inverter loss map 58D, and a shaft power map 58E for a given machine. Other systems may have additional and/or different losses to consider such as windage and friction which should be considered as well. The maps for each of the parameters 58A-58E are generated from empirical data generated during operation and testing of the system.

To generate the efficiency maps, the electric machine is operated over a wide range of torque demands and speeds. As the electric machine is exercised, each of the above-listed parameters is measured. From these measurements, the maps 58A-58E are generated, indicative of the hysteresis, eddy, copper, inverter and machine shaft power losses over different speeds and torque ranges of the machine respectively.

With the maps 58A-58E defined, a map generation module 55 is then used to generate the continuous operation efficiency map 52 and the zero torque losses map 56 for the electric machine. The peak efficiency torque map 54 is then extracted from the continuous operation efficiency map 52. The peak efficiency torque map 54 is essentially a plot that maps the torque that corresponds to the maximum efficiency of the electric machine as a function of speed. Similarly, the zero torque losses map is generated from empirical data collected during operation of the electric machine over a wide range of speeds with the inverter controlling zero torque.

As described in more detail below, the continuous operation efficiency map 52, the peak efficiency torque map 54 and the zero torque losses map 56 are each used during modulated control of an electric machine whether operated as a motor or generator.

Permanent Magnets, BEMF and Field Weakening

For certain applications, including battery powered vehicles including hybrids, electric machines with rotor designs using permanent magnets are common. Such electric machines include, but are not limited to, permanent magnet assisted synchronous reluctance motor, Internal Permanent Magnetic (IPM) motors, and/or EESM type machines. While such electric machines are generally efficient and relatively inexpensive, and therefore advantageously used in electrical vehicle applications, they have some issues that are less than ideal.

When an electric machine with a rotor design is energized using permanent magnets or externally excited as is the case with EESM, the rotor begins to rotate in sync with the stator magnetic field. The rotating permanent magnets of the rotor, in turn, induce an electromagnetic force or "EMF" in the stators windings, commonly referred to as back EMF or "BEMF". BEMF acts against the applied voltage that causes the stator current to flow, and hence, the rotor to spin in the first place. As a result, the current flowing in the stator falls to zero as the BEMF approaches the applied voltage to the electric machine so naturally limiting the shaft speed.

Field weakening is a known technique used to reduce the negative effects of BEMF. By reducing or weakening the magnetic field, BEMF is reduced allowing the generation of motoring torque and when generating controlling the BEMF to less than that limited by the inverter supply voltage allows controlled current to flow back to the inverter power supply at speeds in excess of that which would be possible without field weakening.

Without field weakening the motor speed will naturally be limited by the inverter's supply voltage to below that requiring field weakening when motoring. To operate at a higher speed it is possible to gradually field weaken such that the BEMF is reduced so as to allow the motor to increase in speed until such time as it becomes limited once more by the supply voltage of the inverter. When the supply voltage is once again exceeded, more field weakening may be applied. Only when the field weakening fails to maintain the BEMF below the inverter's supply voltage will the BEMF exceed the inverter's supply voltage. This may result in uncontrolled rectification due to the uni-polar nature of the power semiconductor devices typically used in the inverter. When this scenario occurs, energy is extracted from the motor and returned to the inverter's power supply (i.e. generating). This will retard the speed of the motor, rapidly resulting in the BEMF being equal to or less than the inverter's voltage.

When generating, the machine is not in control of the speed at which it rotates. As such unless it is field weakened, as per motoring, the BEMF will exceed the inverter's voltage but this time the uncontrolled rectification will only place a retarding torque on the shaft which may or may not slow the speed. This is typically an area of operation that is not desirable because even disabling the inverter will not stop the uncontrolled rectification.

Modulated Electric Machine Control

Figure 6:
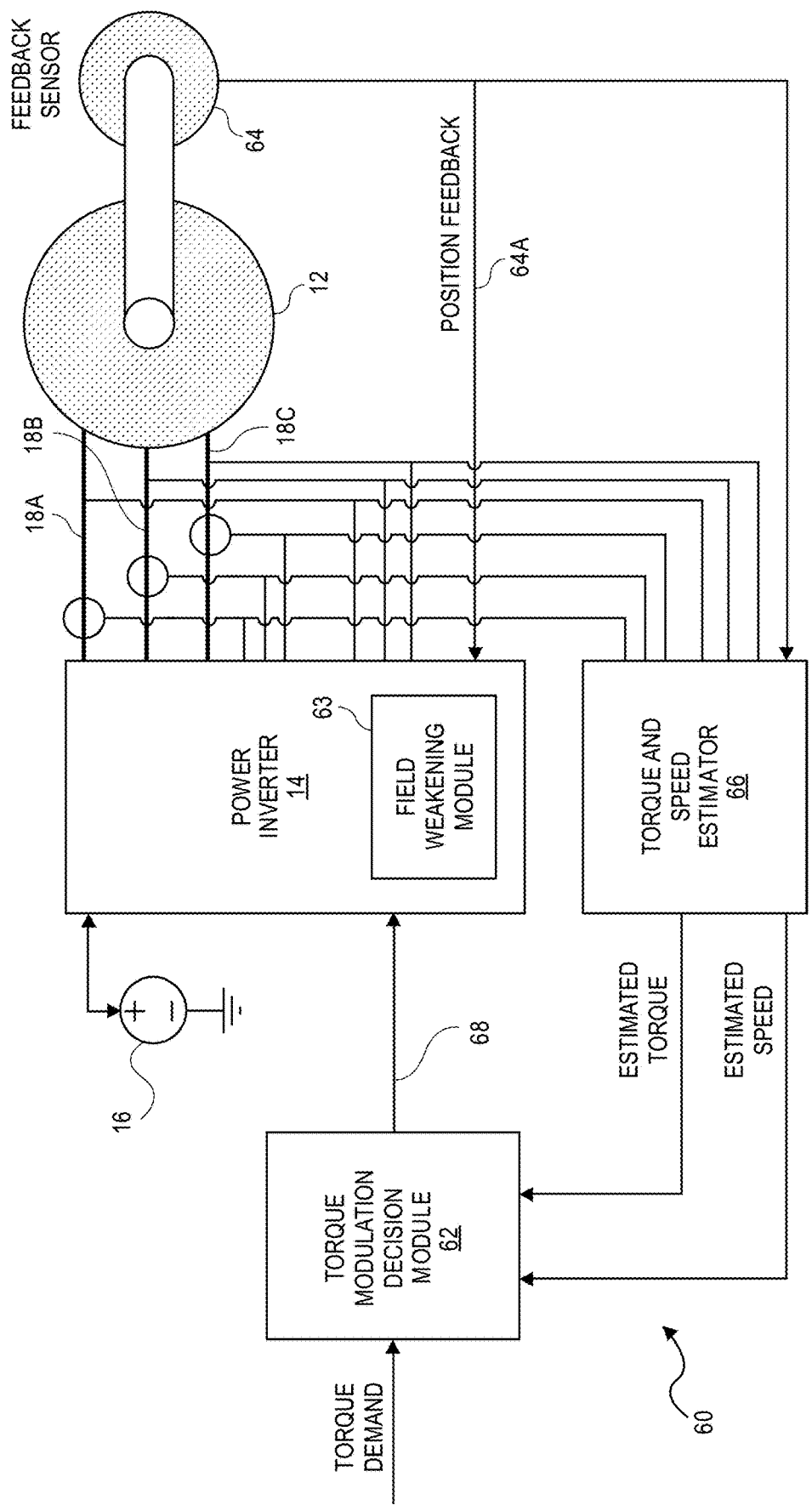
FIG. 6 is a diagram illustrating a controller for modulating energy supplied to an electric machine in accordance with a non-exclusive embodiment of the invention.

Referring to FIG. 6, a diagram illustrating a system 60 for pulse modulating the energy supplied to and from an electric machine 12 with permanent magnets is illustrated. The system 60 includes the electric machine 12, a power inverter 14 for controlling three-phased AC power (denoted as 18A, 18B and 18C for phases A, B and C respectively) to and from a DC power supply 16 to control the electric machine 12, a torque control decision module 62, a field weakening module 63 provided within the inverter 14, an optional feedback sensor 64 for generating a feedback signal 64A indicative of the angular position of the rotor of the electric machine 12 and an optional torque and speed estimator 66.

During operation of the system 60, the torque modulation decision module 62 receives a torque demand. In response, the torque modulation decision module 62 makes a determination of whether the requested torque demand is more or less than a designated "pulsing" threshold associated with the current machine speed. The pulsing threshold will vary as a function of the speed of the electric machine 12 and possibly other considerations. In some embodiments, the pulsing threshold for a given speed may be the same as the peak efficiency torque of the electric machine 12 for that speed. In other situations, other considerations or factors, such as slew or NVH, that may go into the determination of the appropriate pulsing threshold for any particular motor/generator speed. The net operational efficiency of the electric machine, or a larger system that includes the electric machine, may also be considered. For instance, if the torque demand is very close to the peak efficiency torque (e.g., 98% or 99% of the peak efficiency torque), then other considerations such as real-world losses associated with pulsed operation may overwhelm any the incremental gain of pulsed versus continuous operation. In which case, the threshold may be modified so as to allow continuous operation. Other factors (e.g., NVH mitigation concerns, or torque slew rate limited by the parameters of the machine) may be considered as well. Accordingly, the term "threshold" as used herein should be broadly construed and should not be limited to just the peak efficiency torque of a given electric machine 12.

When the torque demand is larger than the threshold, the torque modulation decision module 62 operates the electric machine 12 in the continuous mode. In which case, the waveform 68 provided to the power inverter 14 is indicative of continuous operation of the electric machine 12. In response, for the three phase electric machine illustrated, the three phase power signals 18A, 18B and 18C generated by the inverter 14 are continuous sinusoidal waves having a required magnitude and phase to support the demanded torque. During continuous operation, the field weakening module 63 may apply field weakening as needed.

When the torque demand is less than the threshold, then the electric machine 12 is operated in a pulsed mode. In which case, the waveform 68 provided by the torque modulation decision module 62 to the inverter 14 defines (a) a duty cycle and (b) magnitude for pulsing the three phase power signals 18A, 18B and 18C to meet the demanded torque.

During pulsed operating of the motor 12, the inverter is activated during pulses and is ideally deactivated between pulses. Deactivating the inverter is conceptually desirable because it helps reduce inverter losses and inverter induced losses during the no torque periods. However, there are times when it will be desirable to have the inverter actively command zero torque during the no torque periods (or at least a portion of the no torque periods). There are several reasons for this. One of the easiest to appreciate relates to back BEMF. As discussed above, when the BEMF of a machine exceeds the supply voltage 16 used by permanent magnet type machines for example, or the fixed excitation with EESM type machines, a retarding torque is generated that can significantly degrade the performance of the machine by limiting the maximum achievable speed, which in turn, reduces overall efficiency. Field weakening is typically used to mitigate or eliminate the retarding torque hence allow the motor speed to increase beyond that limited by the fixed field excitation. BEMF generated by a motor is primarily a function of motor speed. Therefore, BEMF remains an issue during the no torque periods of pulsed motor control. Since field weakening is applied by the inverter, deactivating the inverter during the no torque periods of pulsed control in operating states of a motor in which field weakening is desired would have the effect of allowing BEMF to retard the motor during those periods thereby reducing the motor's overall efficiency (sometimes quite significantly). To mitigate these effects, the inverter is preferably left on commanding a zero torque during the no torque periods of pulsed control in operating regions where the BEMF exceeds the supply voltage.

It must be noted here that an advantage of the EESM is that it is possible by reducing its rotor field current to always allow the deactivation of the stator inverter and in many cases also the deactivation of the rotor converter. In some cases, it may be desirable to maintain the EESM rotor current at a level that requires the stator to apply field weakening. In such cases the inverter cannot be turned off in field weakening.

In some embodiments, the inverter 14, effectively determines whether the BEMF of the electric machine 12 exceeds the supply voltage 16 used by the inverter 14. This can be accomplished by comparing the machine's current shaft speed (e.g. RPM) to a known speed threshold or via other suitable techniques. When the BEMF is less than the supply voltage 16 for permanent magnet type electric machines, or the excitation for EESM type machines, then the inverter is deactivated during the no torque periods of pulsed controls. On the other hand if the BEMF value is larger than the supply voltage, then the inverter 14 remains activated, zero torque is demanded, and the field weakening module 63 applies field weakening as appropriate. In response, the BEMF is reduced and any retarding torque that would otherwise be generated by the electric machine is mitigated or eliminated altogether.

The pulsed electric machine control framework described above generally chooses one of three operating modes states for any given operational state (e.g. machine speed and torque demand) based on efficiency and potentially other considerations. First, in operating regions where pulsed control doesn't offer efficiency benefits, the electric machine is continuously operating in continuous manner. In operating regions where pulsed control does offer benefits, pulsing is employed. When operating in the pulsed mode, a further decision is made regarding whether to disable the inverter during the no torque periods. The inverter disable decision is made primarily based on efficiency considerations. When conditions permit and it is more energy efficient to disable the inverter during the no torque periods, the inverter is disabled. When it is more energy efficient to maintain the inverter commanding a zero torque during the no torque periods of pulsed control, the inverter is operated in that manner. In the context of BEMF, when BEMF exceeds the supply voltage 16, the inverter 14 is kept activate to facilitate the application of field weakening thereby mitigating or eliminating retarding torque that would be detrimental to the efficiency of the electric machine.

In practice, the characteristics of the electric machine and or a system that includes the electric machine may be characterized through the creation of operational maps such as the efficiency and loss maps described above. Base on such maps, the most efficient operational state for any and all operating conditions (e.g., all possible machine speed and output level combinations) can be determined. In this context, the operational state may include an indication of whether pulsed control is enabled, and if so, (a) the desired target output level when during the torque on periods; (b) the desired duty cycle; and (c) whether the inverter should be remain active or be deactivated during the no torque periods. In some embodiments, this information may be stored in a data structure such as a lookup table that may be utilized by torque modulation decision module 62 to determine the appropriate inverter control signal 68 for any commanded output (e.g., torque demand) based on the current machine speed, etc. In other embodiments, the torque modulation decision module may use algorithmic or other suitable approaches to make such decisions.

In an optional embodiment, the feedback sensor 64 generates the feedback signal 64A, which is indicative of the angular position of the rotor of the electric machine 12. The feedback signal 64A is provided to each of the power inverter 14 and the torque and speed estimator 66. With the angular position of the rotor known, the torque and speed estimator 66 can provide accurate estimates of the torque and speed of the electric machine to the torque modulation decision module 62. In response, the waveform 68 can be adjusted as necessary so that the timing of switching network (i.e., the timing of turning the switches S1-S6 on/off) within the power inverter 14 can be precisely controlled so that each of the phases 18A, 18B and 18C are timed to ensure the distribution of the torque pulses either mitigate or do not induce NVH. As a result, the operation of the electric machine 12 is both smooth and efficient.

It should be noted that the use of a feedback sensor 64 is not mandatory and that other techniques can be used for measuring or estimating the angular position of the rotor of the electric machine 12. For instance, any of a number of sensor-less approaches may be used as well. Example of sensor-less approaches may include BEMF sensing, phase current sensing, saliency detection through high frequency injection or other methods or any combination of thereof.

With conventional continuous operation, the losses are continuous. On the other hand, with pulsed modulation, losses are largely dependent on the duty cycle. With pulsed modulation, the electric machine oscillates between its operational peak efficiency during pulses and in the time periods between pulses, either the inverter is deactivated, or the inverter is activated, zero torque is demanded, and any retarding torque is mitigated or eliminated. As a result, losses are minimal, and the average torque is generated at an overall higher efficiency level compared to the same average torque generated by conventional continuous operation. Pulsed modulation, therefore, offers a gain in efficiency over conventional continuous operation when an electric machine is operating in regions below its peak efficiency torque.

It is noted that in some circumstances, using a constant pulsed duty cycle may result in undesirable noise, harshness, and vibration (NVH). Also, the use of a certain frequency or frequencies may disproportionately excite and cause unacceptable levels of NVH. In such circumstances, constant duty cycles and/or frequencies may be best avoided. In some implementations, sigma-delta modulation may be used to mitigate such issues. In a non-exclusive embodiment, the torque modulation decision module 62 is a sigma-delta decision module. Exemplary sigma-delta decision modules are described in the U.S. application Ser. Nos. 16/353,159 and 16/353,166, both filed Mar. 14, 2019, and both incorporated herein for all purposes.

It is noted that the above description of the electric machine 12 is largely described in the context of operating as a motor. It should be understood that when the electric machine operates as a generator, the pulsed control provides more efficient generation of electrical energy.

Operational Flow Diagrams

Figure 7A:
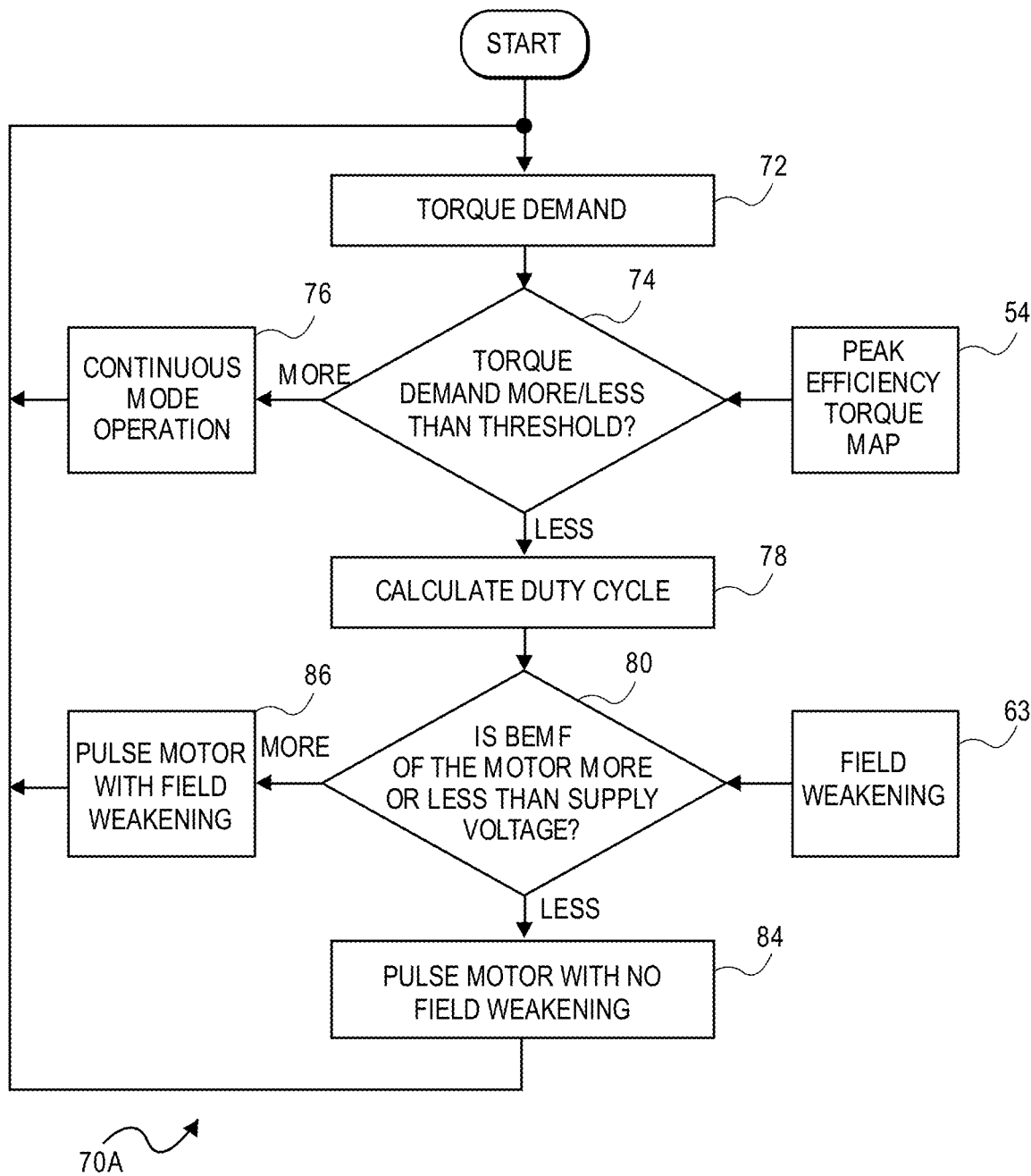
FIGS. 7A and 7B are flow diagrams illustrating control steps for modulating the control of an electric machine.
Figure 7B:
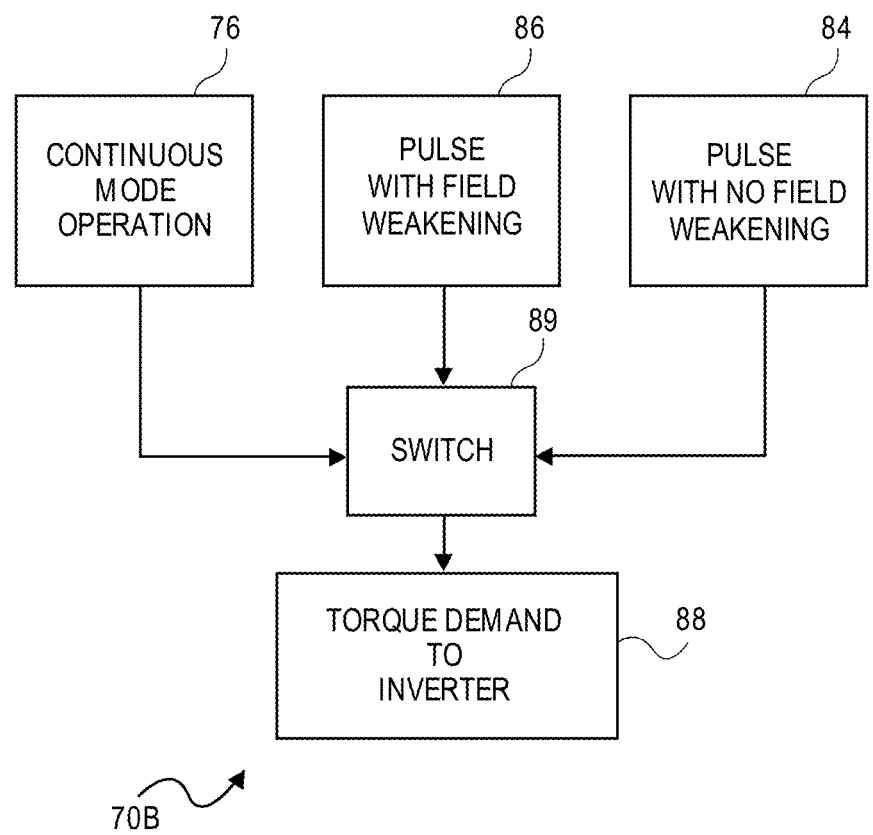

Referring to FIGS. 7A and 7B, operational flow diagrams 70A, 70B for implementing pulsed modulation with field weakening is illustrated.

In step 72, the torque demand requested of the electric machine 12 received.

In decision 74, the torque modulation decision module 62 compares the demanded torque with a predetermined pulsing threshold for the current speed. As previously noted, the threshold can be the same or different than the peak efficiency torque for the current speed.

In step 76, the torque modulation decision module 62 determines the electric machine 12 should operate in the continuous mode if the torque demand is greater than the pulsing threshold. During continuous operation, the field weakening module 63 may apply field weakening as needed. On the other hand, if the torque demand is less than the threshold, a decision is made to operate the electric machine 12 in a pulsed mode.

In step 78, a duty cycle for the pulses is defined by the torque modulation decision module 62. As previously described, typically any of a number of different duty cycles may be used to meet the requested torque demand and the selected duty cycle may be based on a number of considerations, such as noise and vibration considerations, current operating rotor speed, and other factors. In general, if multiple duty cycles are an option, one or more criteria or priorities may be used to select among the different options. For example, if efficiency alone is the highest priority, then the duty cycle providing the highest efficiency is selected. If NVH is the highest priority, then the duty cycle offering the lowest level of NVH, perhaps at the expense of efficiency, is selected. In yet other embodiments, a duty cycle based on a tradeoff between efficiency, NVH, or perhaps other considerations, may be selected. Also, in embodiments where the module 62 is a sigma-delta module, a pulse on/no pulse sequence that meets the duty cycle is defined using sigma-delta modulation.

In decision 80, it is determined if the field weakening module 63 should apply field weakening or not based upon a comparison of motor BEMF and the inverter supply voltage. This decision is then used to decide if the inverter can be deactivated during the period of time between pulses.

If BEMF is less than the supply voltage for the inverter, then the electric machine is operated in the pulsed mode with the inverter 14 being deactivated during the period of time between the pulses with no field weakening.

If BEMF is more than the supply voltage for the inverter, then the inverter 14 remains active during the no torque periods between pulses with a commanded torque of zero. This allows the inverter to continue to apply field weakening during the no torque periods between pulses. As a result, uncontrolled return rectified current is reduced and the resulting retarding torque is mitigated or eliminated.

It is noted that with the above arrangement, it is possible to transition from inverter deactivated to inverter activated with zero torque demand with field weakening (or vice versa) during the period between two pulses. However, as the time period between pulses is typically relatively small in most real word applications, it may not be practical to do so.

The operational steps associated with the flow diagrams 7A, 7B may be implemented in a number of ways. In one embodiment, the torque modulation decision module 62 may rely on an algorithm to implement the above-described steps. In an alternative embodiment, the torque modulation decision module 62 may relying on one or more look up tables. Depending on the torque demand and current speed, the torque modulation decision module 62 is able to make decisions if the torque demand is more or less than the pulsing threshold and if field weakening should be applied or not. In such embodiments, the one or more tables are typically constructed from empirical data collected while exercising the electric machine 12 over a wide range speeds and torque demands. As the electric machine 12 is tested, parameters are collected over a wide range of speed and toque request combinations and then tabulated, resulting in the one or more look up tables.

Power Inverter with Boost

In commonly assigned U.S. application Ser. No. 16/818,570 filed Mar. 13, 2020, an exemplary power inverter including a boost circuit was disclosed. The disclosed inverter includes a switching network having a pair of switches, each coupled between positive and negative voltage rails, for each of phases A, B and C coupled respectively for exciting a machine. The boost circuit includes a boost supply (e.g., charge pump or separate voltage source) capable of generating a boost voltage and/or a storage device such as another capacitor and/or battery. During pulsed operation, the boost supply is used to boost the voltage of the positive rail. As a result, the transition of the pulses is faster, which further improves efficiency. In a non-exclusive embodiment, the boost circuit as described in the aforementioned U.S. application Ser. No. 16/818,570 is incorporated herein and may be used as the power inverter 14 as described herein.

Three Phased Energy Signal Examples

As described herein, operation of the electric machine 12 has been described in a continuous mode, a pulsed mode, a pulse mode using delta-sigma modulation and finally in a pulsed mode with the application of field weakening. For the sake of clarity, exemplary three phased AC current signals 18A, 18B and 18C for phases A, B and C used to excite the machine 12 are described below for each scenario.

Figure 8A:
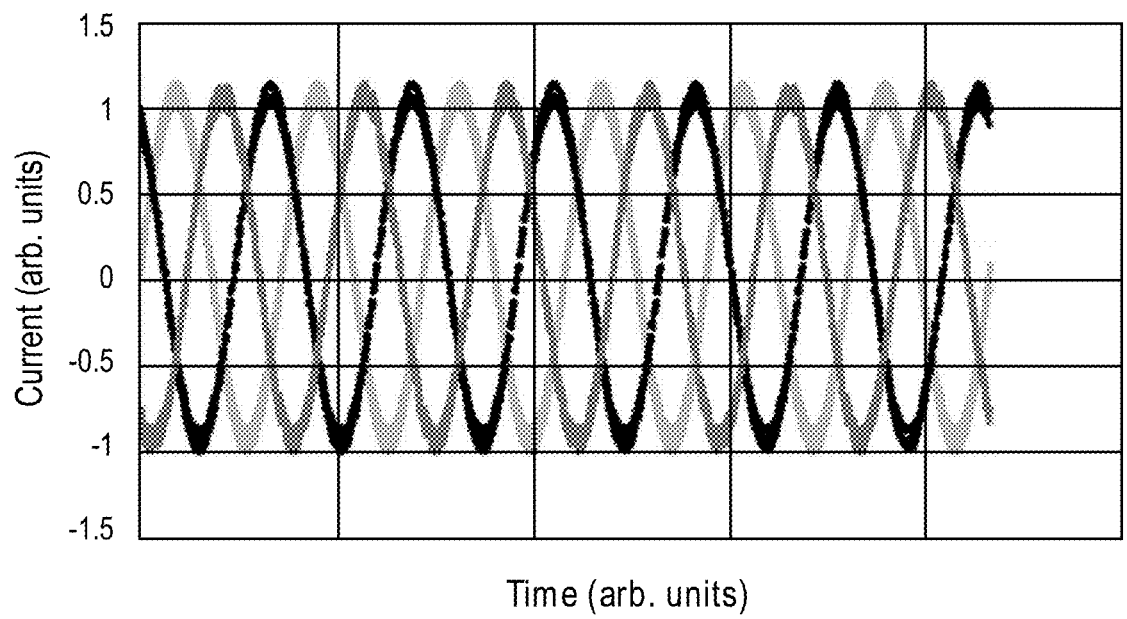
FIG. 8A through FIG. 8D are various examples of three-phased AC power signals used to excite an electric motor under various conditions in accordance with various embodiments.

Referring to FIG. 8A, exemplary three phased AC power signals for phases A, B and C used to excite the machine 12 during continuous operation are shown. In this situation, the current signals are proportional to the demanded torque. As a result, shaft toque meets the demanded torque.

Figure 8B:
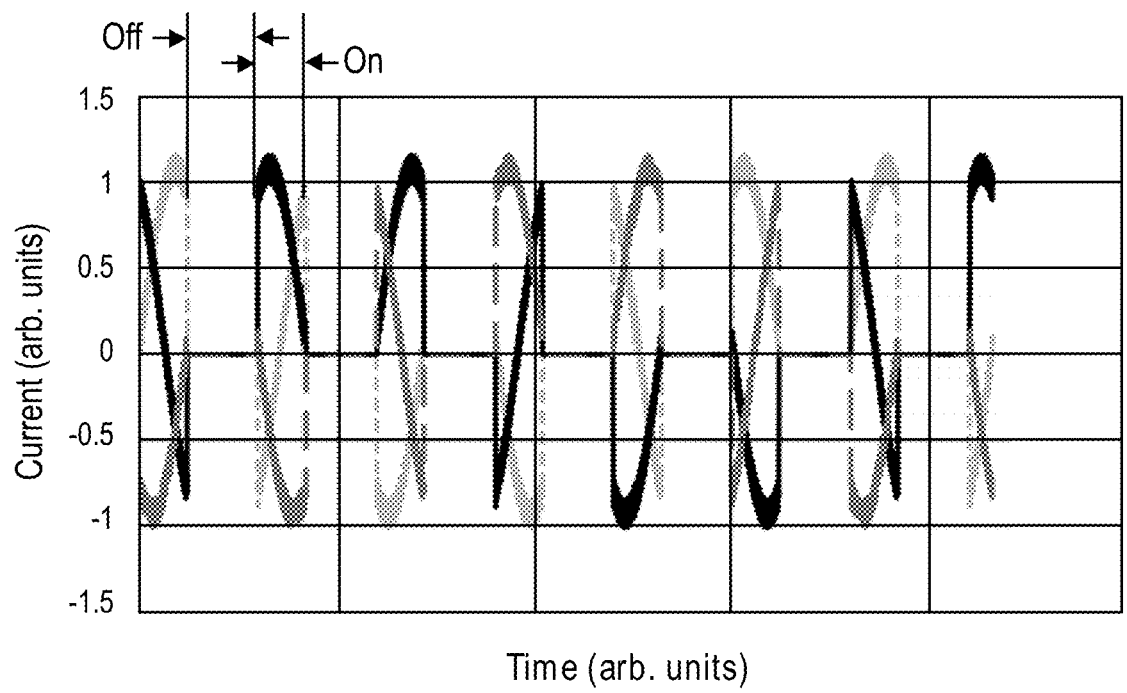

Referring to FIG. 8B, exemplary three phased AC power signals for phases A, B and C are shown during pulsed operation. By modulating the phase excitation of the signals between the peak efficiency, or optionally peak efficiency adjusted for NVH or other factors such as slew, during pulses and off between pulses as shown, the average shaft torque is equal to the demanded torque (e.g., forty percent (40%)), but typically operates more efficiently than generating a continuous torque output at the same level. As previously noted, the pulse frequency or duty cycle can be adjusted as needed based on noise, vibration and harshness and/or other considerations.

Figure 8C:
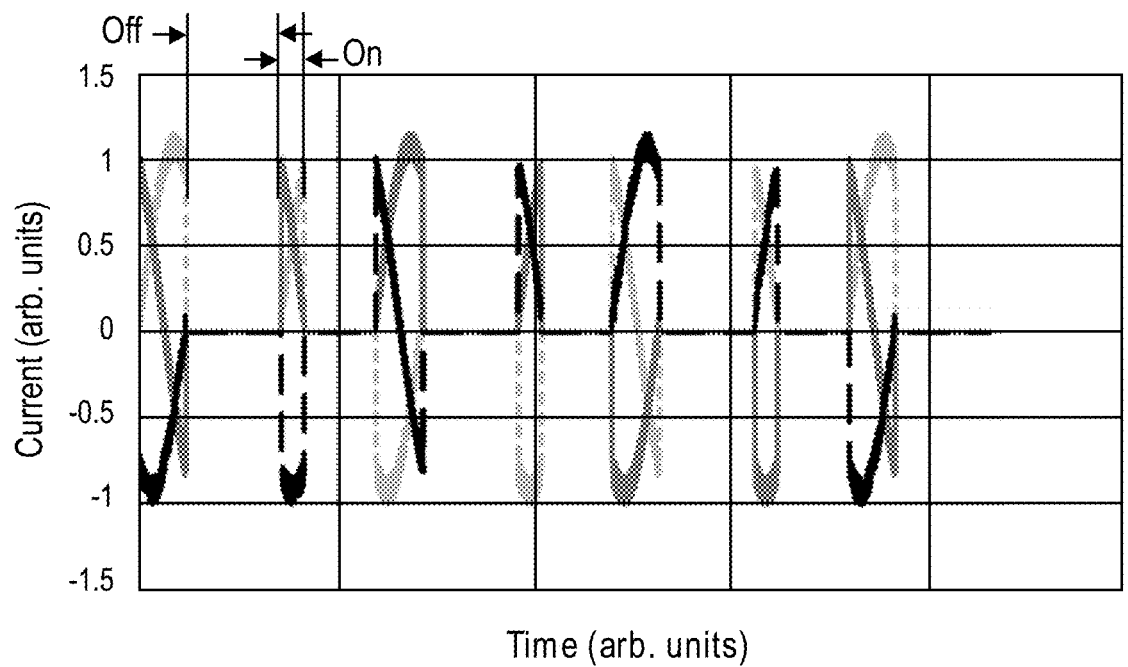

Referring to FIG. 8C, exemplary phase excitation current of the AC power signals are shown when the torque modulation decision module 62 uses sigma-delta modulation. In this particular example, the duty cycle of forty percent (40%) is illustrated. If the same pulse width of FIG. 8B is used, an exemplary pulse pattern of (pulse, skip, skip, pulse and skip) can be used to achieve the 40% duty cycle using sigma-delta modulation.

Figure 8D:
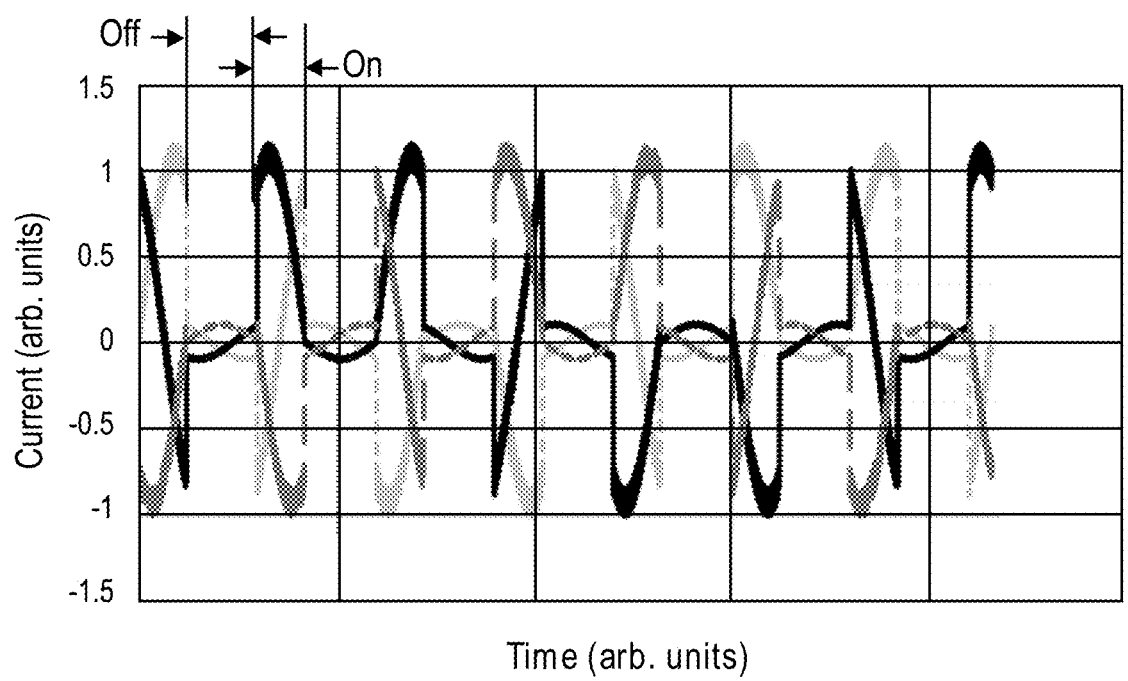

Finally, FIG. 8D shows exemplary phase excitation current of the AC current signals when the BEMF exceeds the voltage supply 16 and field weakening is applied. In FIG. 8D, several differences are present with regard to the pulsed operation without field weakening as illustrated in FIG. 8B and FIG. 8C. First, between pulses a small magnetizing current flows through the inverter 14. As a result, the inverter is not entirely disable between pulses. It is also noted in FIG. 8D that a phase shift occurs in the waveform between the activated period and the deactivated period representing the phase shift between torque producing current and pure demagnetizing only current.

Electrically Excited Synchronous Machines (EESMs)

Electrically Excited Synchronous Machines (EESMs), sometimes referred to as Wound Rotor Synchronous Machine (WRSM) or Wound Field Synchronous Machine (WFSM), rely on electro-magnets on the rotor instead of permanent magnets to form the rotor poles. The main advantage in doing this is that as the BEMF approaches the available power supply voltage, the rotor electro-magnets can be reduced in flux, hence reducing or maintaining the BEMF of the EESM below that which can be supported by the power supply voltage. In contrast with internal permanent magnet electrical machines, additional current is needed to create an opposite electromagnetic flux to that of the permanent magnet to maintain the BEMF less than that which can be supported by the power supply voltage. Also, by not using permanent magnets, EESMs are not subject to the economics of the rare earth metals conventionally used with electric machines having permanent magnets.

Pulsed control of EESMs is particularly attractive for certain applications, such as electric or hybrid vehicles for several reasons. In certain regions of the world, there is a push to reduce or eliminate the usage of rare earth metals. EESMs are thus a viable alternative since they do not use magnets made with rare earth metals. Also, rare earth metals are often expensive. EESMs are, therefore, often more economical to manufacturer. Furthermore, although EESM type machines tend to be less efficient due to the need to excite their rotors using electro-magnets at low speeds. As the speed increases, however, this disadvantage dissipates and starts to become an advantage when the rotor flux needs to be reduced to maintain the BEMF less than that which can be supported by the power supply voltage. For these reasons, EESMs are a viable and attractive option for electric vehicles, hybrid vehicles, and other applications.

Figure 9A:
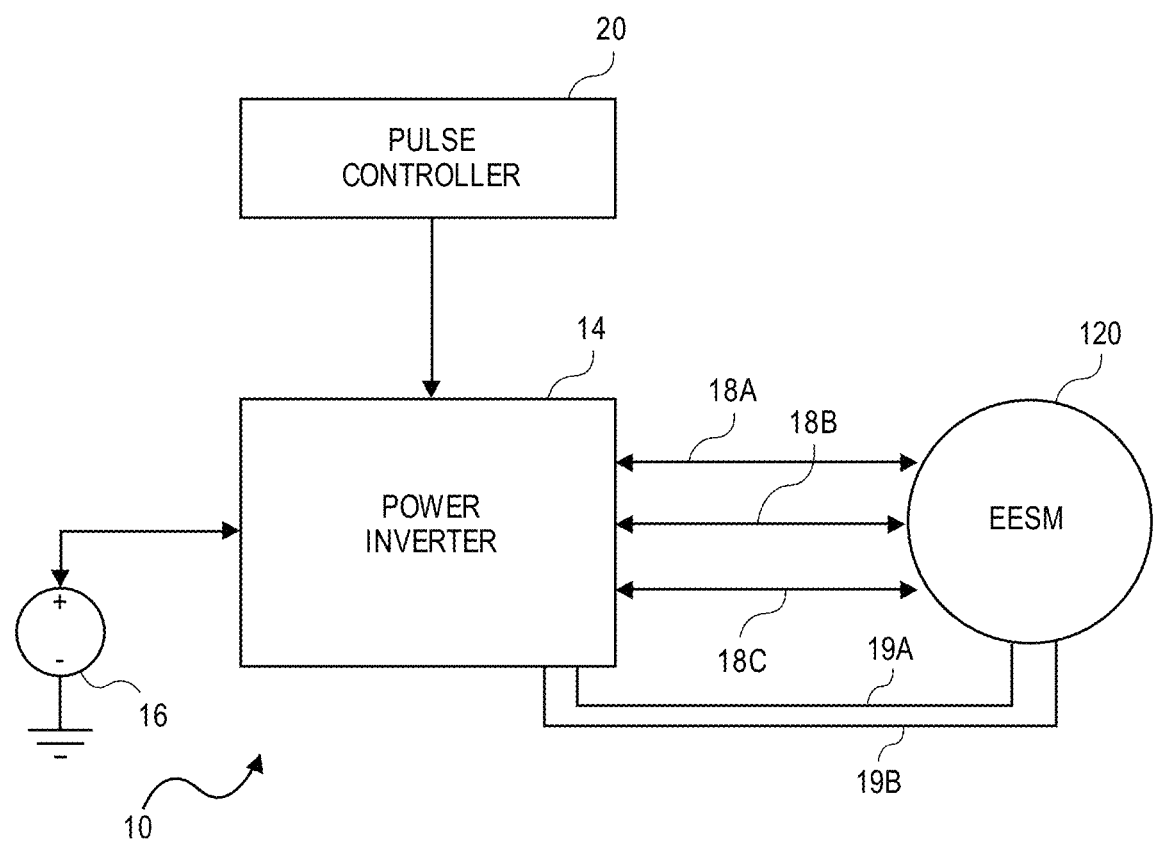
FIGS. 9A-9B illustrate an Electrically Excited Synchronous Machine (EESM).
Figure 9B:
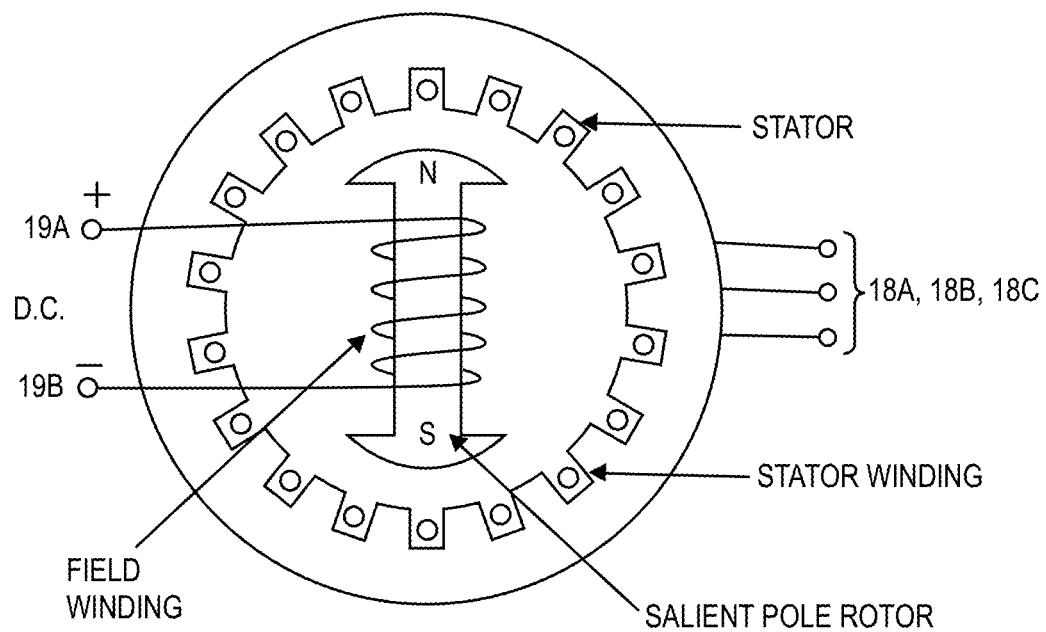

Referring to FIGS. 9A and 9B, various diagrams depicting an exemplary pulsed controlled EESM 120 is shown. As depicted in FIG. 9A, the pulse control of EESM 120 is essentially the same as electric machine 12 of FIG. 2, except there are rotor winding connections 19A and 19B from the power inverter 14 to the EESM 120. As best depicted in FIG. 9B, the rotor winding connections 19A and 19B are connected to the (+) and (−) terminals of the rotor windings, creating North and South electro-magnet poles on the field windings of the rotor. As is well known in the art, when three-phase power 18A, 18B and 18C are applied to the stator windings of the stator, the rotor rotates, generating work. When operating as a motor, the EESM 120 generates a torque output. When operating as a generator, mechanical energy is converted into electrical energy which is stored, for example in the power supply 16.

FIGS. 10A-10C, 11, and 12A—12C are each similar to FIGS. 4A-4C, 6, and 8A-8C, but are modified specific for EESM type machines. Given the similarity of these drawings, certain aspects relevant to EESM are discussed below for each of 10A—10C, 11, and 12A—12C. However, for the sake of brevity, many of the features that are in common with FIGS. 2, 4A—4C, 6, and 8A-8C are not discussed below, but are equally applicable.

Figure 10A:
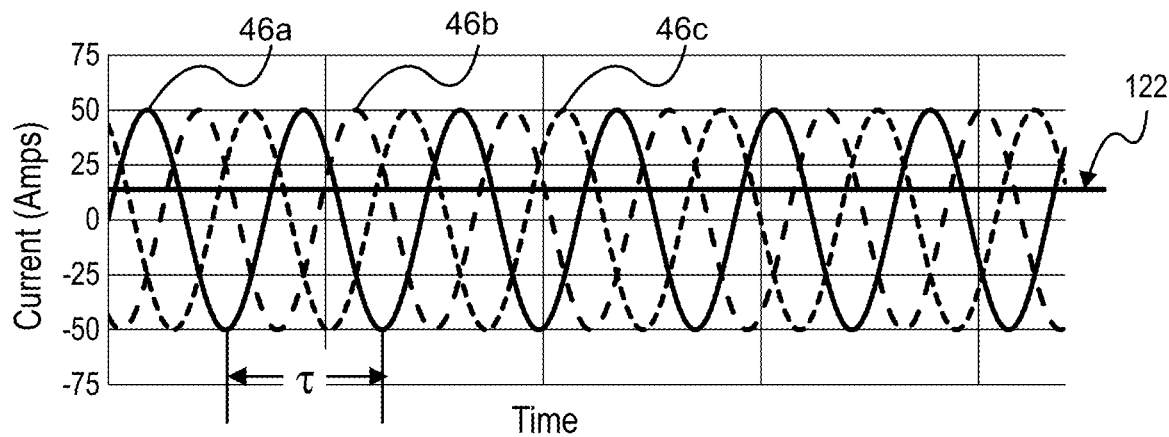
FIG. 10A is a diagrammatic representation of a continuous three-phase AC waveform provided to an EESM.

FIG. 10A is a diagrammatic representation of a continuous three-phase AC waveforms 46a-46c provided to the stator of an EESM. In this diagram, 122 represents the constant DC current through the rotor resulting from the voltage differential of the rotor winding connections 19A and 19B applied to the (+) and (−) terminals, energizing and creating North and South electro-magnet poles on the field windings of the rotor of the EESM.

Figure 10B:
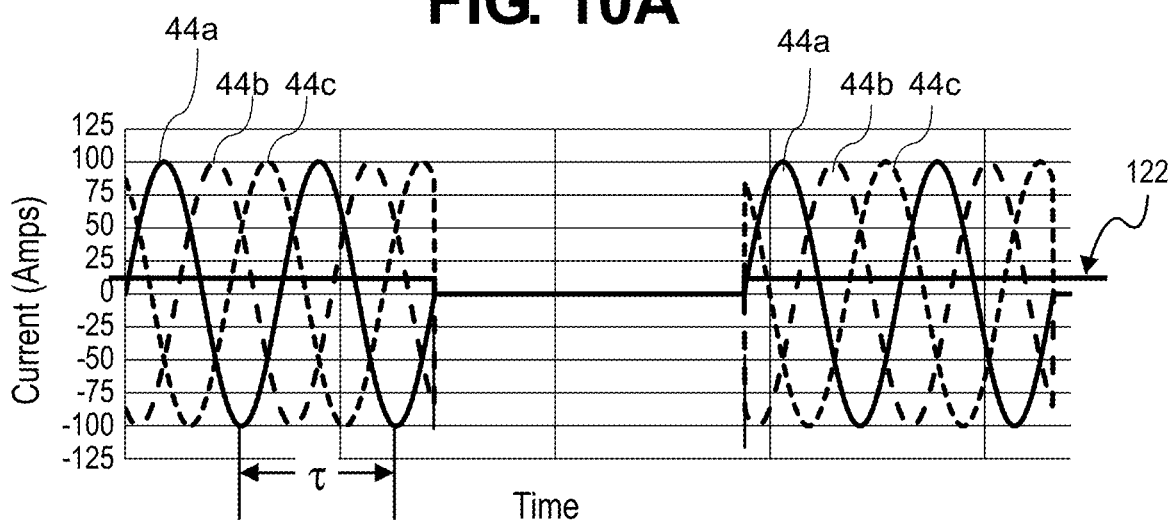
FIGS. 10B and 10C are different examples of pulsed three-phase AC waveforms provided to an EESM.
Figure 10C:
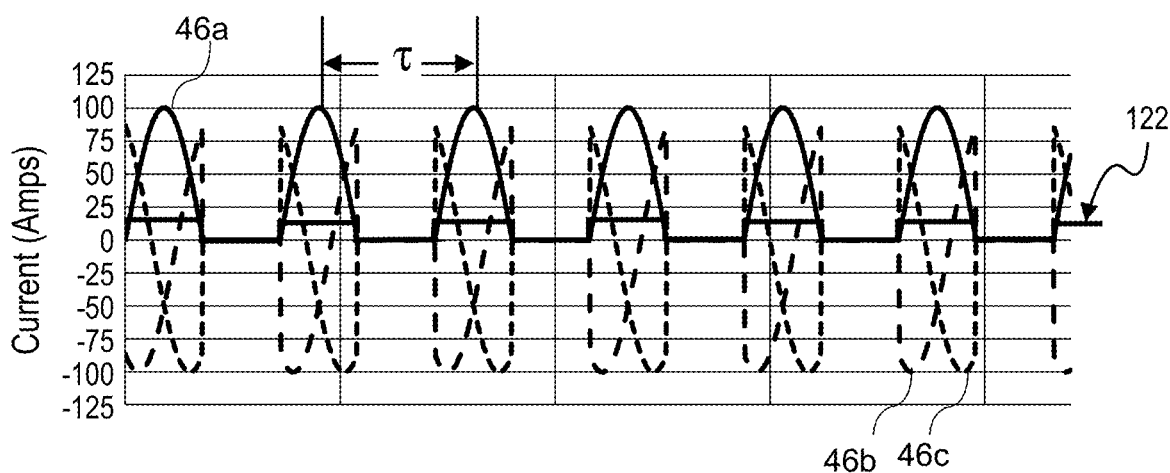

In contrast, FIGS. 10B and 10C show different examples of pulsed control of the EESM 120. With both examples, the magnitude, frequency, and the duty cycle of the three-phase AC waveforms are selected to provide the same torque output of the EESM as the continuous waveform of FIG. 10A.

In FIG. 10B, the current pulses 44a-44c provided to the stator of the EESM are pulsed on for a duration of 2τ, and interleaved with "off" periods of equal length. As depicted in the diagram, the DC current 122 is also pulsed on and off so that the rotor is energized during the on pulses for 2τ in duration and de-energized during the off periods between the on pulses.

In FIG. 10C, the current pulses 46a-46c provided to the stator of the EESM are pulsed on for duration of τ/2 and interleaved with "off" periods of the same duration between the on pulses. The DC current 122 is also pulsed on and off so that the rotor is energized during the on pulses and de-energized between the on pulses.

In both examples of FIGS. 10B and 10C, the duty cycle is 50%. However, the duration of the "on" and "off" time periods is different, i.e., the frequency of the pulsed modulation is different.

Figure 11:
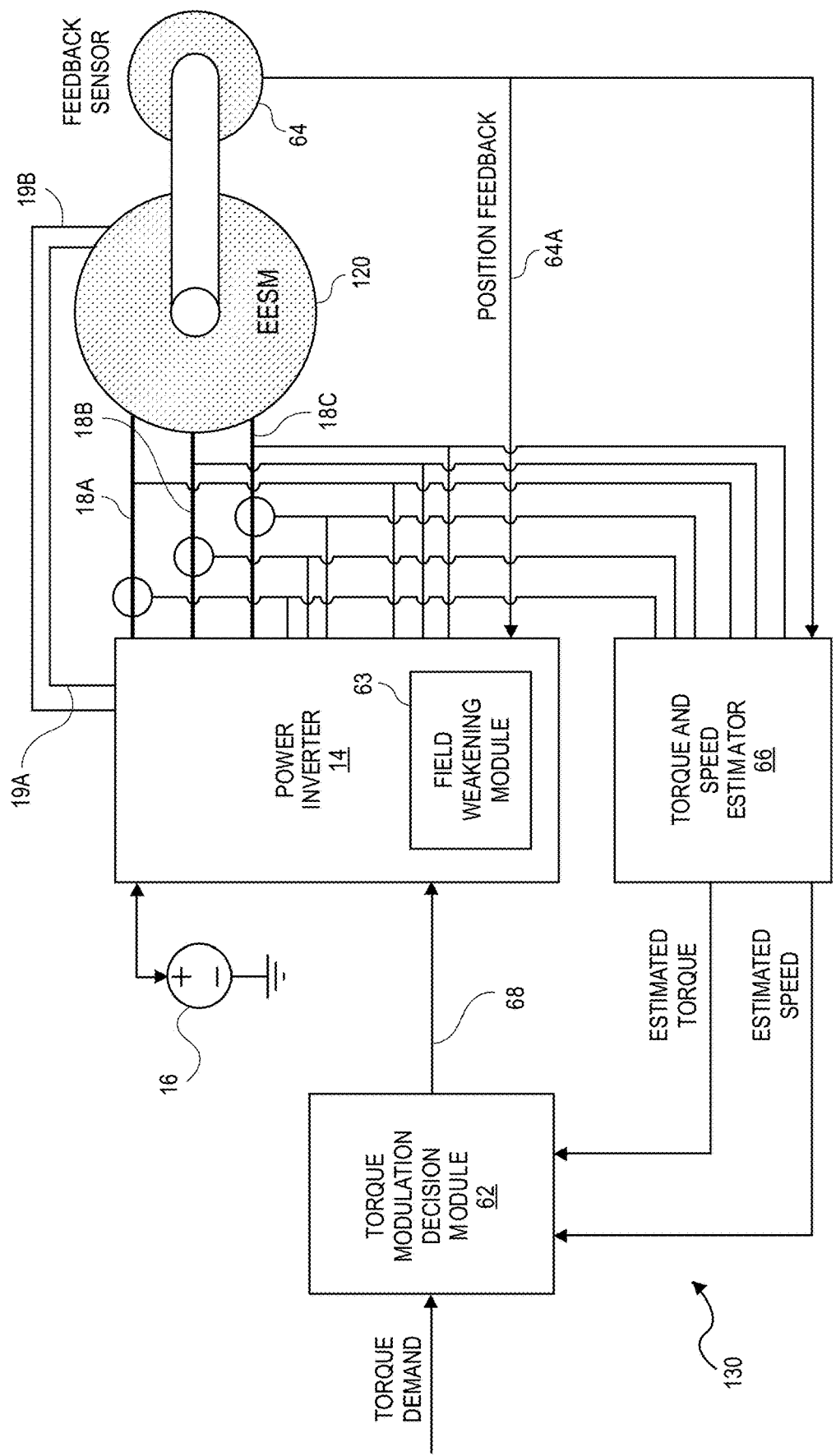
FIG. 11 is a diagram illustrating a controller for modulating energy supplied to an EESM in accordance with a non-exclusive embodiment of the invention.

Referring to FIG. 11, a diagram illustrating a system 130 for pulse modulating the energy supplied to and from an EESM is illustrated. The system 130 includes the EESM 120, a power inverter 14 for controlling three-phased AC power (denoted as 18A, 18B and 18C for phases A, B and C respectively) and to energize the rotor winding connections 19A and 19B from the DC power supply 16, a torque control decision module 62, a field weakening module 63 provided within the inverter 14, an optional feedback sensor 64 for generating a feedback signal 64A indicative of the angular position of the rotor of the EESM 120 and an optional torque and speed estimator 66.

Based on the above discussion, the flow charts illustrated in FIGS. 7A and 7B are applicable to the EESM 120 as described herein. For the sake of brevity however, a detailed explanation is not repeated herein.

During operation of the system 130, the flow charts of FIGS. 7A and 7B are more or less applicable and are implemented. That is, the torque modulation decision module 62 receives a torque demand. In response, the torque modulation decision module 62 determines whether the requested torque demand is more or less than a designated "threshold" associated with the current speed of the EESM 120. In determining if the torque demand is more or less than the threshold. The torque modulation module 62 may consult one or more efficiency tables or maps per step 54, or alternatively, an algorithm may be used. If more than the threshold, then the continuous mode is used per step 76. If less than the threshold, then a duty cycle is calculated (step 78). In decision step 80, the torque modulation module determines if BEMF of the EESM 120 is more or less than the supply voltage 16. If less, the EESM is operated in the pulsed mode with no field weakening (step 84). If more, then the field weakening module 63 is used to apply field weakening while operating the EESM in the pulsed mode (step 86). In the case of field weakening, an EESM module 63 not only controls the stator but also the rotor currents to optimize the operating conditions for the EESM. This is normally optimized for maximum efficiency.

Figure 12A:
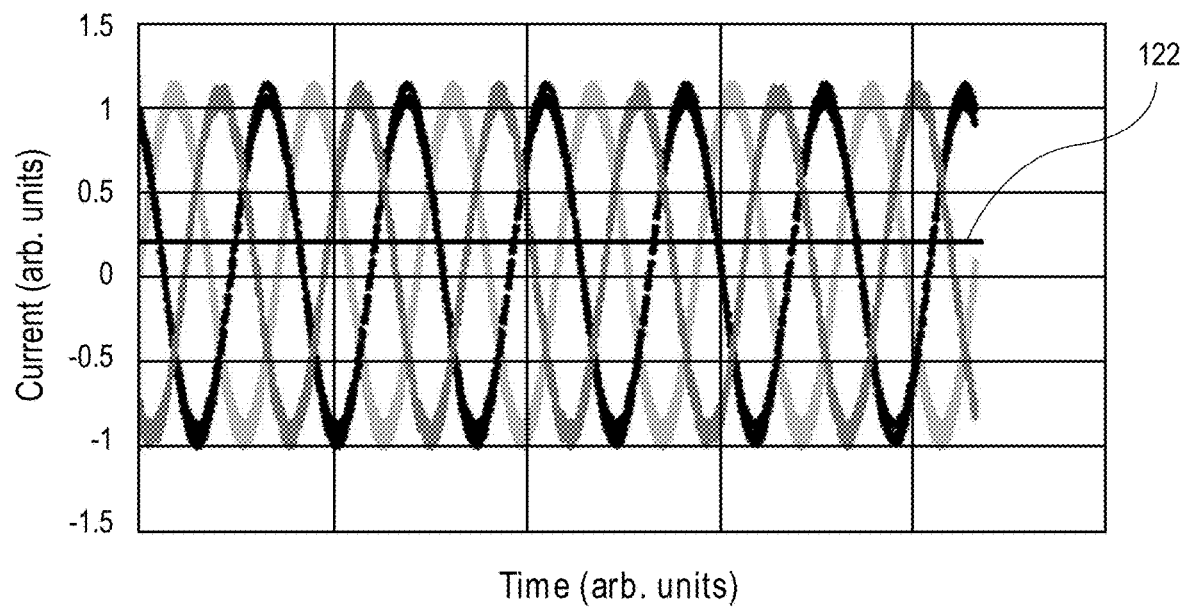
FIG. 12A through FIG. 12C are various examples of three-phased AC power signals used to excite an EESM under various conditions in accordance with various embodiments.
Figure 12B:
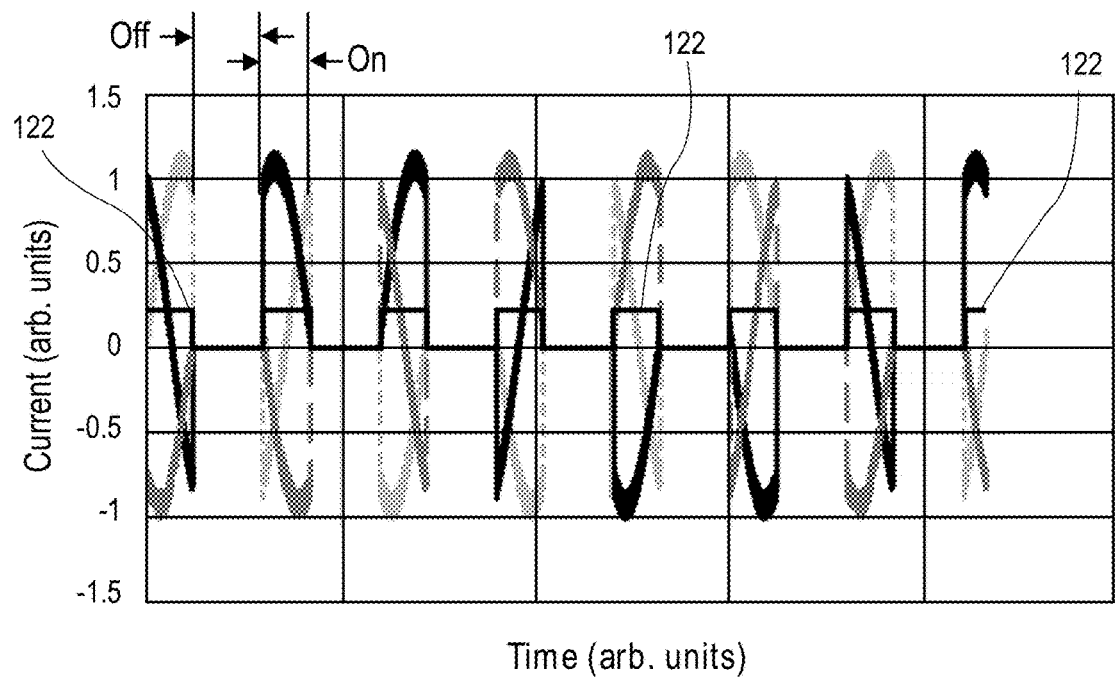

Referring to FIG. 12A though 12C, exemplary three phased AC power signals for phases A, B and C used to excite the machine 12 during continuous and pulsed operation are shown. Specifically, in FIG. 12A, the three phased AC power signals for phases A, B and C are continuous. In FIGS. 12B and 12B, the power signals for phases A, B and C are pulsed. In FIG. 8C, another exemplary phase excitation current of the AC power signals for phases A, B and C are shown when the torque modulation decision module 62 uses sigma-delta modulation. In this particular example, the duty cycle of forty percent (40%) is illustrated. If the same pulse width of FIG. 8B is used, an exemplary pulse pattern of (pulse, skip, skip, pulse and skip) can be used to achieve the 40% duty cycle using sigma-delta modulation. By modulating the phase excitation of the three phase signals A, B and C during pulses and off between pulses are shown in both 12B and 12C, the average shaft torque is equal to the demanded torque (e.g., forty percent (40%)), but typically operates more efficiently than generating a continuous torque output at the same level. As previously noted, the threshold for pulsed operation, along with the pulsing frequency or duty cycle in the pulsed mode can be adjusted as needed based on NVH, slew rate, and other real-world and/or practical considerations.

Figure 12C:
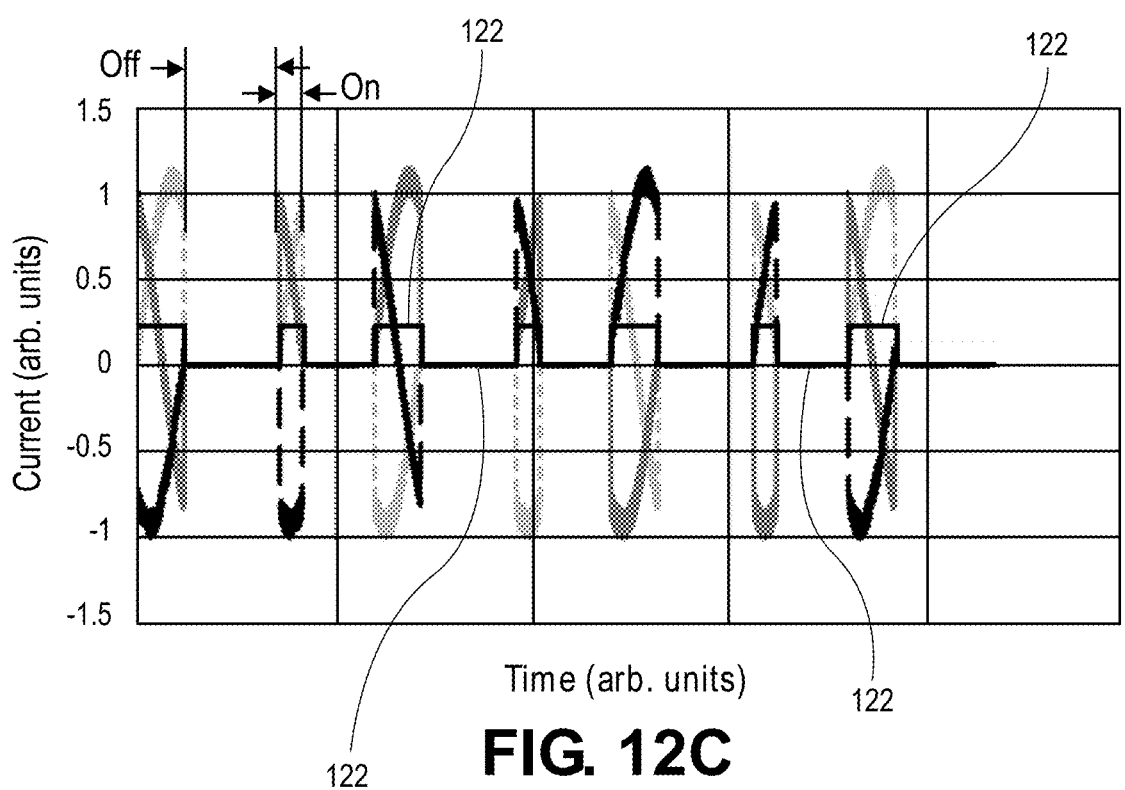

With each of FIGS. 12A through 12C, the DC current 122 provided to the rotor of the EECM 120 via the rotor winding connections 19A and 19B from the DC power supply are shown. In FIG. 12, the current is continuous. In 12B and 2C, however, the DC current is pulsed to coincide with the on pulses and reduced to zero between the on pulses.

Determining the Threshold

In some embodiments, the threshold can be set as a peak efficiency percentage or range at a given speed of the EESM. In other embodiments, the threshold may vary as a function of not only the speed of the EESM 120, but possibly other considerations, such as NVH, slew rate, and other real-world losses or practicalities. With these latter embodiments, the threshold for a given speed may start as the peak efficiency percentage or range, but then modified to take into account one or more factors such as slew or NVH, that may go into the determination of a given threshold for any particular speed.

The net operational efficiency of the EESM, or a larger system that includes the EESM, may also be considered in determining the threshold. For instance, if the torque demand is very close to the peak efficiency torque (e.g., 98% or 99% of the peak efficiency torque of the EESM), then other considerations such as real-world losses associated with pulsed operation may overwhelm any the incremental gain of pulsed versus continuous operation. In which case, the threshold may be modified so as to allow continuous operation. Other factors (e.g., NVH, or torque slew rate limited by the parameters of the EESM) may be considered as well.

Accordingly, the term "threshold" as used herein should be broadly construed and should include both just the peak efficiency torque of a given EESM 120, or the peak efficiency torque adjusted for other factors, such as NVH, slew rate, and/or other machine or system losses due to pulsed operation.

When the torque demand is larger than the threshold, regardless of how threshold is defined, the torque modulation decision module 62 operates the EESM 120 in the continuous mode. In which case, the waveform 68 provided to the power inverter 14 is indicative of continuous operation of the electric machine 12. In response, the three phase power sinusoidal signals 18A, 18B, 18C, and the voltage provided to the rotor winding connections 19A and 19B, are each continuous. During continuous operation, the field weakening module 63 may apply field weakening as needed.

Alternatively, when the torque demand is less than the threshold, again regardless of how threshold is defined, then the EESM 120 is operated in a pulsed mode. In which case, the waveform 68 provided by the torque modulation decision module 62 to the inverter 14 defines (a) a duty cycle and (b) magnitude for pulsing the three phase power signals 18A, 18B and 18C, and the pulsing the energization of the rotor winding connections 19A and 19B.

Field Weakening

In some embodiments, the inverter 14, effectively determines whether the BEMF of the EESM 120 exceeds the supply voltage 16 used by the power inverter 14. This can be accomplished by comparing the current shaft speed (e.g. RPM) of the EESM to a known speed threshold or via other suitable techniques. When the BEMF is less than the supply voltage 16 for the excitation for EESM type machines, then the power inverter 14 is deactivated during the no torque periods of pulsed control. On the other hand, if the BEMF value is larger than the supply voltage, then the inverter 14 dependent upon the desired operating conditions the field weakening module 63 will either apply field weakening via the stator current or/and reduce the rotor current. In response, the BEMF is reduced and any retarding torque that would otherwise be generated by the electric machine is mitigated or eliminated altogether. During a DMD off period where possible module 63 preferably, but not necessarily, disable the inverter even during field weakening.

The field weakening module 63 may implement field weakening by reducing flux of the EESM. The flux is defined by the equation:

Rotor Flux=(Current×Rotor Inductance), where Current is the current through the windings of the rotor and Inductance is the inductance of the rotor (i.e., the tendency of the rotor to oppose a change in the current flowing through it).

Thus, as evident from the equation above, flux of the EESM can be reduced by reducing either the rotor current, rotor inductance, or both. The rotor inductance of a given EESM, however, is typically fixed, and depends on such factors as the number of windings, the magnetic material used in the rotor (typically a laminated silicon iron core material), etc.

One strategy for dynamically applying field weakening during the operation of a given EESM involves the reduction of the rotor current. In some circumstances, however, the current through the windings of the rotor tend to have a relatively high time constant. Consequently, reducing the flux of the EESM during field weakening by reducing the current may be somewhat slow for some applications. One possible strategy to overcome such a timing issue is to use an EESM with an inherently low inductance L.

Inductance of a given EESM is a function of the turns squared of the rotor and the volume of the windings of the rotor (where the volume is defined by the Cross Sectional Area (CSA) of the conductor multiplied by the total length of the conductor used for all the turns, or the mean length of a single turn multiplied by CSA multiplied by the number of turns for all conductors used for the rotor windings). Consequently, by reducing the number of turns, or increasing the volume of the windings, or both, the inductance of the rotor can be reduced. For a given the excitation voltage, an EESM with an inherently low inductance, the rotor current will change faster compared to the same or similar EESM, but with a higher rotor inductance. Accordingly, when using field weakening, using an EESM with a relatively low rotor inductance may be beneficial in reducing transition times when applying field weakening.

The flux of the EESM may be reduced by reducing the id of the stator. id, and its counterpart iq, are stationary currents derived mathematically to represent the real phase currents 18a, 18b and 18c provided to the stator of the EESM 12. As the equations below demonstrate, iq can be reduced in one of several ways. In one way, iq is reduced by reducing the amplitude of the phase current Ia, Ib, and Ic (otherwise referred to herein as phase currents 18a, 18b and 18c) while maintaining the electrical angle ωt constant. In another way, the electrical angle ωt is changed constant while the amplitude of the phase current Ia, Ib, and Ic are held constant.

$$V_d = \frac{2}{3}(V_a \sin(\omega t) + V_b \sin(\omega t - 2\pi/3) + V_c \sin(\omega t + 2\pi/3))$$

$$V_q = \frac{2}{3}(V_a \cos(\omega t) + V_b \cos(\omega t - 2\pi/3) + V_c \cos(\omega t + 2\pi/3))$$

$$V_0 = \frac{1}{3}(V_a + V_b + V_c),$$

Rotor inductance L=v (t)/(di/dt)=Magnetic flux (i)/I, where v (t) is the voltage across the inductor L as a function of time and di/dt is the differential of the inductor L current as a function of time. Inductance is therefore a function of the slope of the magnetic flux density vs. field strength (B-H) curve. When there is magnetic material involved as the current increases the magnetic material will eventually start to saturate the magnetic material. In this case, the magnetic material refers to the laminated silicon iron core material of the rotor. As the magnetic material saturates the slope of the BH curve reduces and hence the inductance reduces. Since induction is a function of the current and the inductance L, and hence the rotor flux, reducing the rotor current results in a reduction in the saturation of the inductance L, which in turn increases the value of the inductance L, which results in a non-linear reduction in field weakening of the rotor flux. The equations below for EESM demonstrate how by reducing the rotor current (ir) reduces the rotor flux ψr, which in turn, reduces the D flux of the machine flux ψd, resulting in field weakening. What these equations do not show is the non-linear relationship of the inductance to the current flowing in that inductance L.

Equations for EESM – Using Fluxes $$V_d = R_s \cdot I_d - \omega_e \cdot \psi_q + \frac{d\psi_d}{dt}$$

$$V_q = R_s \cdot I_q + \omega_e \cdot \psi_q + \frac{d\psi_q}{dt}$$

$$V_r = R_r \cdot I_r - \omega_e \cdot \psi_q + \frac{d\psi_R}{dt}$$

$$T = \frac{3 \cdot N_p}{4} \cdot (-I_d \cdot \psi_q + I_q \cdot \psi_d)$$

Equations for EESM – Assuming Linear Current–Flux Relationship $$\psi_d = L_d \cdot I_d + L_m \cdot I_r$$

$$\psi_q = L_q \cdot I_q$$

$$\psi_r = L_m \cdot I_d + L_r \cdot I_r$$

$$V_d = R_s \cdot I_d - \omega_e \cdot L_q \cdot I_q + \frac{d}{dt}(L_d \cdot I_d + L_m \cdot I_r)$$

$$V_q = R_s \cdot I_q + \omega_e \cdot (L_d \cdot I_d + L_m \cdot I_r) + L_q \cdot \frac{dI_q}{dt}$$

$$V_r = R_r \cdot I_r + \frac{d}{dt}(L_m \cdot I_d + L_r \cdot I_r)$$

$$T = \frac{3 \cdot N_p}{4} \cdot ((L_d - L_q) \cdot I_d + I_q + L_m \cdot I_r \cdot I_q)$$

Thus, the reduction of the flux of the EESM, for applying field weakening, involves one of (i) reducing Id current of the stator, (ii) reducing rotor flux by reducing rotor current, or (iii) a combination of (i) and (ii).

One possible issue with reducing the flux of the rotor by either current or inductance is that the torque may also be reduced. If we reduce the inductance, for example by using a smaller number of turns of the rotor, then it may be beneficial to compensate by increasing the current to maintain the same flux. This actually helps reduce the rise time of the rotor flux given the same driving voltage even though the time constant stays the same for a fixed current density in the winding, based upon the fact that the resistance of the winding is reduced, I(t)=Vbus/R(1-e$^{-L/R}$). Equally it can be said that based upon the same equation increasing the voltage will also reduce the rise time of the rotor flux. In most applications it will be a combination of reducing the rotor inductance (turns) and increasing the driving voltage (Vbus).

Electric Machine Types

The electric machine 12 as described herein is any type of electric machine capable of reducing BEMF by applying field weakening. Examples of include, but are not limited to machines and/or motors including, but not limited to, internal permanent magnets, EESM, induction, synchronous reluctance, permanent assisted synchronous reluctance, separately excited induction, flux switching, switch reluctance, and other types of machines and/or motors.

The present embodiments should be considered illustrative and not restrictive, and the invention is not to be limited to the details given herein but may be modified within the scope and equivalents of the appended claims.

What is claimed is:

1. A method comprising:
   operating an Electrically Excited Synchronous Machine (EESM) in a pulsed mode; and
   applying field weakening to the EESM if back electromagnetic force (BEMF) of the EESM is more than a supply voltage used to excite the EESM.

2. The method of claim 1, further comprising operating the EESM in the pulsed mode when a demanded request of the EESM is equal to or less than a threshold, wherein the threshold is indicative of a peak efficiency operating percentage or range for the EESM.

3. The method of claim 1, further comprising operating the EESM in the pulsed mode when a demanded request of the EESM is equal to or less than a threshold, wherein the threshold is indicative of a peak efficiency percentage or range for the EESM, but modified to accommodate one or more of the following:
   (a) Noise, Vibration or Harshness (NVH);
   (b) slew;
   (c) operational losses due to pulsed operation; or
   (d) any combination of (a) through (c).

4. The method of claim 1, further comprising applying no field weakening to the EESM when the BEMF of the EESM is less than the supply voltage.

5. The method of claim 1, further comprising:
   operating the EESM in a continuous mode if a received demand exceeds a pulsing threshold; and
   applying no field weakening to the EESM when the BEMF of the EESM is less than the supply voltage used to excite the EESM during operation in the continuous mode.

6. The method of claim 1, further comprising:
   ascertaining a duty cycle and a magnitude for pulses when operating the EESM in the pulse mode; and
   selectively exciting a rotor of the EESM, the rotor of the EESM selectively excited to coincide with the pulses of the EESM when operating in the pulsed mode.

7. The method of claim 1, further comprising using sigma-delta modulation to modulate pulses when operating the EESM in the pulse mode and selectively exciting a rotor of the EESM, the rotor of the EESM selectively excited to coincide with the modulated pulses of the EESM when operating in the pulsed mode.

8. The method of claim 1, further comprising preventing or mitigating the EESM from generating a retarding torque when the field weakening is applied to the EESM.

9. The method of claim 8, wherein reducing the flux of the EESM further comprises one of (i) reducing Id current of the stator, (ii) reducing rotor flux by reducing rotor current, or (iii) a combination of (i) and (ii).

10. The method of claim 1, wherein operating the EESM in the pulsed mode further comprises interspersing: (i) on pulses in which the EESM is generating an output with (ii) off periods between the on pulses in which the EESM is generating little or no output.

11. The method claim 1, further comprising ascertaining if the EESM should operate in the pulsed mode or a continuous mode based on one of the following:
    (a) a received work demand;
    (b) a speed of the EESM;
    (c) Noise, Vibration and Harshness (NVH);
    (d) slew;
    (e) operational losses due to operation in the pulsed mode;
    (f) one or more of (a) through (e) relative to a threshold; and
    (g) any combination of (a) through (f).

12. The method of claim 1, further comprising using either an algorithm or one or more efficiency map(s) or table(s) to ascertain if the EESM should operate in the pulsed mode or a continuous mode.

13. The method of claim 1, further comprising deactivating a power inverter, which provides phased power to and excites a rotor of the EESM, between on pulses when the BEMF is less than the supply voltage.

14. The method of claim 1, wherein applying the field weakening to the EESM if further comprises reducing flux of the EESM.

15. The method of claim 14, wherein reducing the flux of the EESM further comprises one of (i) reducing Id current of the stator, (ii) reducing rotor flux by reducing rotor current, or (iii) a combination of (i) and (ii).

16. An Electrically Excited Synchronous Machines (EESM) assembly configured to:
    selectively operate in a pulsed mode in which an output of the EESM assembly is pulsed; and
    apply field weakening when the EESM assembly is operating in the pulsed mode and a back electromagnetic force (BEMF) of the EESM assembly exceeds a supply voltage used to excite the EESM assembly.

17. The EESM assembly of claim 16, further comprising an inverter configured to use the supply voltage to provide (a) multi-phase current to a stator of the EESM, and (b) DC current to a rotor of the EESM.

18. The EESM assembly of claim 16, further comprising a decision module configured to:
    receive a work demand for the EESM assembly;
    operate the EESM assembly in a continuous mode if the received work demand exceeds a threshold; and
    operate the EESM assembly in the pulsed mode if the received work demand is less than the threshold.

19. The EEMS assembly of claim 16, further comprising a decision module configured to decide to operate the EESM assembly in a continuous or the pulsed mode, the decision module relying on one of the following in making the decision:
    (a) a received demand output for the EESM assembly;
    (b) a peak efficiency percentage or range of the EESM assembly;
    (c) Noise, Vibration and Harshness;
    (d) slew;
    (e) operational losses due to pulsed operation; or
    (f) any combination of (a) through (e).

20. The EEMS assembly of claim 16, further comprising a decision module configured to provide one or more signals to an inverter of the EESM assembly indicative of either continuous operation or pulse operation.

21. The EESM assembly claim 20, wherein the one or more signals is/are indicative of a duty cycle for on pulses when operating the EESM assembly in the pulse mode.

22. The EESM assembly of claim 21, wherein the inverter, during the pulsed mode operation, turns on and off both (a) multi-phase current provided to a stator of the EESM assembly, and (b) DC current provided to a rotor of the EESM assembly.

23. The EESM assembly claim 16, further comprising a field weakening module to either (a) apply the field weakening when the BEMF of the EESM assembly exceeds the supply voltage or (b) not apply the field weakening when the BEMF is less than the supply voltage.

24. The EESM assembly claim 16, further comprising a sigma-delta modulation module configured to use sigma delta modulation to control pulsing of the EESM assembly during the pulsed mode operation.

25. The EESM assembly claim 16, further arranged to also apply field weakening during continuous operation of the EESM assembly when the BEMF of the EESM assembly exceeds the supply voltage.

26. The EESM assembly claim 16, wherein applying the field weakening further comprises reducing flux of the EESM.

27. The EESM assembly of claim 26, wherein reducing the flux of the EESM further comprises one of (i) reducing Id current of the stator, (ii) reducing rotor flux by reducing rotor current, or (iii) a combination of (I) and (ii).

28. An electric vehicle, comprising:
an Electrically Excited Synchronous Machine (EESM);
a controller configured to:
ascertaining a torque demand;
ascertaining Noise, Vibration, and Harshness (NVH) associated with operation of the electric vehicle; and
decide to operate the EESM in a continuous mode or a pulsed mode based at least partially on a combination of (a) the ascertained torque demand relative to a threshold and (b) the ascertained NVH of the electric vehicle.

29. The electric vehicle of claim 28, wherein the threshold factors in one or more of the following:
(c) a peak efficiency percentage or range of the EESM assembly;
(d) the ascertained NVH associated with the operation of the electric vehicle;
(e) a pulse slew rate associated with operating the EESM in the pulsed mode;
(f) operational losses due to pulsed operation in the pulsed mode; or
(g) any combination of (a) through (f).

30. The electric vehicle of claim 28, further comprising an inverter configured to (a) provide multi-phase power to a stator of the EESM; (b) DC current to excite a rotor of the EESM; and (c) pulse on and off both (a) and (b) to coincide with a duty cycle of on pulses of the EESM when operating in the pulsed mode.

31. The electric vehicle of claim 28, wherein the controller is further configured to operate the EESM in the continuous mode if the ascertained torque demand is less than the threshold, but the ascertained NVH of the electric vehicle exceeds an NVH threshold.

32. The electric vehicle of claim 28, wherein the controller is further configured to operate the EESM in the continuous mode if the ascertained torque demand is more than the threshold.

33. The electric vehicle of claim 28, further comprising a field weakening module configured to apply field weakening during the pulsed mode operation of the EESM when back electromagnetic force (BEMF) of the EESM exceeds a supply voltage that is used to excite the EESM.

34. The electric vehicle of claim 28, further comprising a field weakening module to either (a) apply the field weakening when back electromagnetic for (BEMF) of the EESM exceeds a supply voltage used to excite the EESM or (b) not apply the field weakening when the BEMF is less than the supply voltage.

35. The electric vehicle of claim 28, further comprising a field weakening module configured to apply field weakening during the continuous operation of the EESM assembly when back electromagnetic for (BEMF) of the EESM assembly exceeds a supply voltage used to excite the EESM.

36. The electric vehicle of claim 28, further comprising a field weakening module to selectively apply the field weakening to the EESM by reducing flux of the EESM.

37. The electric vehicle of claim 36, wherein reducing the flux of the EESM further comprises one of (i) reducing Id current of the stator, (ii) reducing rotor flux by reducing rotor current, or (iii) a combination of (i) and (ii).

38. The electric vehicle of claim 28, wherein the controller further comprises a sigma-delta module configured to use sigma-delta modulation to control pulsing of the EESM in the pulsed mode.

* * * * *